US010567252B1

United States Patent
Mukhopadhyaya et al.

(10) Patent No.: US 10,567,252 B1
(45) Date of Patent: Feb. 18, 2020

(54) NETWORK CONNECTION SERVICE HIGH AVAILABILITY EVALUATION FOR CO-LOCATION FACILITIES

(71) Applicant: Equinix, Inc., Redwood City, CA (US)

(72) Inventors: Utpal Mukhopadhyaya, San Jose, CA (US); Sindhu Payankulath, Saratoga, CA (US); Syed Nawaz, Santa Clara, CA (US); Syed Mohammad Farooq, Milpitas, CA (US)

(73) Assignee: Equinix, Inc., Redwood City, CA (US)

( * ) Notice: Subject to any disclaimer, the term of this patent is extended or adjusted under 35 U.S.C. 154(b) by 211 days.

(21) Appl. No.: 15/392,704

(22) Filed: Dec. 28, 2016

(51) Int. Cl.
*H04L 29/06* (2006.01)
*H04L 12/26* (2006.01)
*H04L 29/08* (2006.01)
*H04L 29/12* (2006.01)

(52) U.S. Cl.
CPC ...... *H04L 43/0805* (2013.01); *H04L 61/2007* (2013.01); *H04L 67/1002* (2013.01)

(58) Field of Classification Search
CPC .......................... H04L 61/2007; H04L 67/1002
See application file for complete search history.

(56) References Cited

U.S. PATENT DOCUMENTS

| 2016/0277315 | A1* | 9/2016 | Miller | H04L 67/322 |
| 2016/0308762 | A1 | 10/2016 | Teng et al. | |
| 2016/0337473 | A1 | 11/2016 | Rao | |
| 2017/0078371 | A1* | 3/2017 | Kodaypak | H04L 67/101 |

* cited by examiner

*Primary Examiner* — Adnan M Mirza
(74) *Attorney, Agent, or Firm* — Shumaker & Sieffert, P.A.

(57) ABSTRACT

Techniques are disclosed for evaluating and facilitating high availability for network connection services provided by network infrastructure of one or more co-location facilities. For example, a computing system receives data from each network device in one or more co-location facilities, the data indicating the respective capability of each network feature of each network device to provide highly available operation across a plurality of communication model layers for supporting a network connection service to customer networks co-located within the one or more co-location facilities. The computing system applies high availability evaluation metrics to the data to determine a high availability capability score for each network device feature of each network device. Further, the computing system determines, based on the high availability capability scores, an indication of the high availability for the network connection service. The computing system outputs, for display, the indication of the high availability of the network connection service.

22 Claims, 8 Drawing Sheets

| Products | IBX Locations | | | | | | | |
| --- | --- | --- | --- | --- | --- | --- | --- | --- |
| | Silicon Valley SV1 | Los Angeles | Ashburn | New York | Toronto | London | Singapore | Sydney |
| Cloud Exchange | ✓ | ✓ | | ✓ | | | | |
| Internet Exchange | | | ✓ | | ✓ | | ✓ | |
| Equinix Connect | | ✓ | ✓ | | | ✓ | | ✓ |
| | | | | | | | | |
| ✓ indicates HA capable | | | | | | | | |

FIG. 4

| ISO OSI Layers | Features configured in the Networking Device (at the Top Level) | Intra-Chassis HA Score Tracking | | | | |
|---|---|---|---|---|---|---|
| | | Granular HA features under each TOP Level feature configured | Feature Score if Present | Feature Score if absent | Weight Factor | Feature HA score | Total Score (15.5-77.5) |
| Layer 4 to Layer 7 | HTTP | | | | | | |
| | TCP | | | | | | |
| | UDP | | | | | | |
| Layer 3 | OSPF | NSF | 5 | 1 | 1 | 5 | 33 |
| | | NSR | 5 | 1 | 1 | 5 | |
| | | Graceful Restart (GR) | 5 | 1 | 1 | 5 | |
| | | ECMP | 5 | 1 | 1 | 1 | |
| | ISIS | | | | | | |
| | BGP | BGP PIC | 5 | 1 | 0.9 | 4.5 | |
| | BFD | | 5 | 1 | 1 | 5 | |
| | EVPN | Multi-homing | 5 | 1 | 0.9 | 4.5 | |
| | MPLS LDP | LDP GR | 5 | 1 | 1 | 1 | |
| | | LDP-IGP Sync | 5 | 1 | 1 | 1 | |
| | | LDP Session Protection | 5 | 1 | 1 | 1 | |
| Layer 2 | STP | | 5 | 1 | 1 | 5 | 19.9 |
| | LAG | | 5 | 1 | 1 | 5 | |
| | MC-LAG | | 5 | 1 | 0.9 | 4.5 | |
| | HSRP | | 5 | 1 | 0.9 | 4.5 | |
| | VRRP | | 5 | 1 | 0.9 | 0.9 | |
| Layer 1 | APS | | 5 | 1 | 1 | 5 | 5 |
| Total Score | | | | | | | 57.9 |

FIG. 7

| Interconnection A | | | |
|---|---|---|---|
| Devices | HA score | Total Score | Normalized score (Total Score/# of devices) |
| Device 1 | 160 | | |
| Device 2 | 110 | | |
| Device 3 | 140 | | |
| Device 4 | 120 | 530 | 132.5 |
| Interconnection B | | | |
| Devices | HA score | Total Score | Normalized score (Total Score/# of devices) |
| Device 5 | 130 | | |
| Device 6 | 170 | 300 | 150 |
| Interconnection C | | | |
| Devices | HA score | Total Score | Normalized score (Total Score/# of devices) |
| Device 7 | | | |
| Device 8 | | | |

FIG. 8

NETWORK CONNECTION SERVICE HIGH AVAILABILITY EVALUATION FOR CO-LOCATION FACILITIES

TECHNICAL FIELD

This disclosure generally relates to computer networks and, more specifically, to co-location facilities for co-location and interconnection.

BACKGROUND

A co-location facility provider (a "provider") may employ a communication facility, such as a data center or warehouse, in which one or more customers of the provider locate network, server, and storage gear and interconnect to a variety of telecommunications and other service provider(s) with a minimum of cost and complexity. Such customers are said to be "co-located" in the co-location facility. Co-location facilities may be shared by the multiple tenants locating networking equipment within the co-location facilities. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses. Customers co-located at a co-location facility typically lease space or storage capacity for a set duration. Assets at a co-location facility, such as cabinets, cages, and ports, may provide customers the leased space or storage capacity.

In some cases, the co-location facility provides network connection services (or "interconnection services") by which customers of the provider may interconnect to one another over the co-location facility network infrastructure or by which a customer of the provider may interconnect its spatially and/or geographically distributed customer networking equipment over the co-location facility network infrastructure. The co-location facility may in such cases be referred to as an "interconnection facility." The provider may provide network connection services accessible to co-located customers via an interconnection, such network connection services including, for example, a cloud exchange, a carrier Ethernet exchange, Internet access or connection service, an Internet exchange, a "metro connect" or metro connection service for reaching other communication facilities within a metropolitan area, a cross-connect from one customer to another (e.g., a customer-to-customer interconnection), and other network connection services. An interconnection may in some cases span multiple logical network boundaries defined by networks deployed by multiple different customers of the provider co-located, in some respect, within the co-location facility and including enterprise, managed services provider, network connection service provider, cloud service provider, and service reseller customers, for instance. These various co-location facility customer networks, each of which may make up at least a portion of the interconnection, may employ heterogeneous network equipment and network management technologies and protocols.

To provide network connection services between customer networks, between co-location facilities, to the Internet, etc., co-location facility network infrastructure may have a complex network topology realized using a large number of networking components (e.g., routers, switches, firewalls, and load-balancers) and application servers (e.g., virtual machines, customized applications) that provide application services for identifying, requesting, and configuring network connection services. The network topology is made further complex by the fact that co-location facility providers frequently add new components and new features to the co-location facility network infrastructure to meet the demands of their customers.

SUMMARY

In general, the disclosure describes techniques for evaluating high availability for network connection services and application services provided by network infrastructure of a co-location facility at multiple layers of the network stack according to an International Standards Organization (ISO) Open Systems Interconnection (OSI) model or Transmission Control Protocol/Internet Protocol (TCP/IP) model. In network engineering, "high availability" for network connection services provided by network infrastructure refers to techniques employed by devices and network engineers to facilitate redundant and resilient operations. High availability at various layers may improve uptime of services the network infrastructure provides by ensuring that the services continue to operate despite failure of one or more components of the network infrastructure. For example, if a device, device component, protocol, or connection fails and does not have resiliency or redundancy, service interrupts to the customer may occur and the co-location facility may fail its Service-Level Agreements (SLAs) requirements.

Accordingly, in one example, a system as disclosed herein assesses the high availability of network connection services and application services across one or more co-location facilities' network and application infrastructure. The system may apply respective high availability metrics to, e.g., different network resiliency features of the network and application infrastructure that is operable at multiple layers. The system may apply individualized scoring for each specific feature of the devices or the overall network and application infrastructure that reflects an importance of the resiliency or redundancy of the specific feature to the overall high availability of the system. Based on the scores for the specific network resiliency features, the system may determine a fine-grained high availability rating for each type of network connection service availability in a co-location facility. The system may present, for display on a dashboard to a co-location facility operator, the high availability rating for each type of network connection service in the one or more co-location facilities. In some examples, the system may apply a threshold to each high availability rating of the various types of network connection services to indicate whether a given type has a requisite level of high availability. In some examples, the high availability rating may be for a prospective network connection service between two customer networks, which may indicate to the co-location facility operator a resiliency of the prospective network connection service if configured. This may be used by the co-location facility operator as at least a partial basis to reject, accept, or upgrade network infrastructure to support the prospective network connection service.

Thus, a system as disclosed herein may perform a granular assessment to determine which services or products in the network do not have high availability. Further, a system as disclosed herein may determine whether specific pieces of hardware, software, and network topology need to be upgraded or redesigned because they suffer deficiencies in reliability or redundancy. Additionally, a system as disclosed herein may determine whether specific components need configuration changes. Further, a system as disclosed herein may dynamically track high availability across each device in the network to account for changes in the network topology as devices, network connection services, and cryptographic methods are added and removed from the network, as well as to account for changes to each device due to the insertion or removal of hardware components and/or modifications to the device's control software. As a result, operations of the co-location facility may enhance or facilitate greater reliability to meet SLA requirements.

In one example, this disclosure describes a method including: receiving, by a computing system, data from each network device of a plurality of network devices in one or more co-location facilities, the data from each network device indicating respective high availability capabilities of a plurality of network device features of the network device to provide resilient operation at a plurality of communication model layers for supporting one or more network connection services to one or more customer networks co-located within the one or more co-location facilities; applying, by the computing system, high availability evaluation metrics to the data from each network device to determine, for each network device feature of the plurality of network device features of the network device, a high availability capability score for the network device feature; determining, by the computing system based on the high availability capability scores for each network device feature of the plurality of network device features of each of the plurality of network devices, an indication of a high availability score for each of the one or more network connection services; and outputting, by the computing system for display, the indication of the high availability score for the one or more network connection services.

In another example, this disclosure describes a computing system configured to: receive data from each network device of a plurality of network devices in one or more co-location facilities, the data from each network device indicating respective high availability capabilities of a plurality of network device features of the network device to provide resilient operation at a plurality of communication model layers for supporting one or more network connection services to one or more customer networks co-located within the one or more co-location facilities; apply high availability evaluation metrics to the data from each network device to determine, for each network device feature of the plurality of network device features of the network device, a high availability capability score for the network device feature; determine, based on the high availability capability scores for each network device feature of the plurality of network device features of each of the plurality of network devices, an indication of a high availability score for each of the one or more network connection services; and output, for display, the indication of the high availability score for the one or more network connection services.

In another example, this disclosure describes a non-transitory computer-readable medium including instructions that, when executed, cause one or more processors of a computing system to: receive data from each network device of a plurality of network devices in one or more co-location facilities, the data from each network device indicating respective high availability capabilities of a plurality of network device features of the network device to provide resilient operation at a plurality of communication model layers for supporting one or more network connection services to one or more customer networks co-located within the one or more co-location facilities; apply high availability evaluation metrics to the data from each network device to determine, for each network device feature of the plurality of network device features of the network device, a high availability capability score for the network device feature; determine, based on the high availability capability scores for each network device feature of the plurality of network device features of each of the plurality of network devices, an indication of a high availability score for the one or more network connection services; and output, for display, the indication of the high availability score for the one or more network connection services.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 4 is an illustration of an example dashboard for presenting information on the high availability evaluation of network connection services of one or more co-location facilities, in accordance with techniques of the disclosure.

FIG. 7 is an illustration of an example dashboard for presenting information on the high availability evaluation of one or more network features of a network device, in accordance with techniques of the disclosure.

FIG. 8 is an illustration of an example dashboard for presenting information on the high availability evaluation of one or more network interconnection services of one or more co-location facilities, in accordance with techniques of the disclosure.

Like reference numerals refer to like elements throughout the figures and description.

DETAILED DESCRIPTION

Co-location facilities may commit to ever-stricter SLAs with its customers that ensure the availability of their service network and application infrastructure with minimal downtime. For example, some co-location facilities desire to move from 99.99% availability (e.g., 53 minutes' downtime per year) to 99.999% availability (e.g., 5 minutes' downtime per year) or to 99.9999% availability (30 seconds' downtime per year). To meet these strict SLAs, co-location facilities require high availability, e.g., high resiliency and high redundancy, in their networks of routers, switches, servers, and other networking components.

A co-location facility may implement a complex network topology comprising thousands of different network components to provide network connection services that meet the SLA requirements of its customers. For example, a co-location facility may develop system-level availability by designing high availability in its constituent components, such as its routers, switches, and servers. Further, the co-location facility may build topological diversity around these components, such as by using a leaf & spine, ring, or full-mesh network topology so that, in the event of link failure, node failure, or server failure, the networks of the co-location facility remain connected and available for use. In the event of such a failure, the co-location facility may use simply tools, such as Ping or Traceroute to validate a new network path. However, given the complexity of this dynamic network topology, other co-location facilities may be unable to determine the high availability of each network connection service across one or more ISO OSI-model or TCP/IP-model layers of the network device.

Accordingly, techniques are described herein for evaluating and facilitating high availability in a co-location facility network infrastructure across multiple ISO OSI-model or TCP/IP-model layers of the network device.

Figure 1:
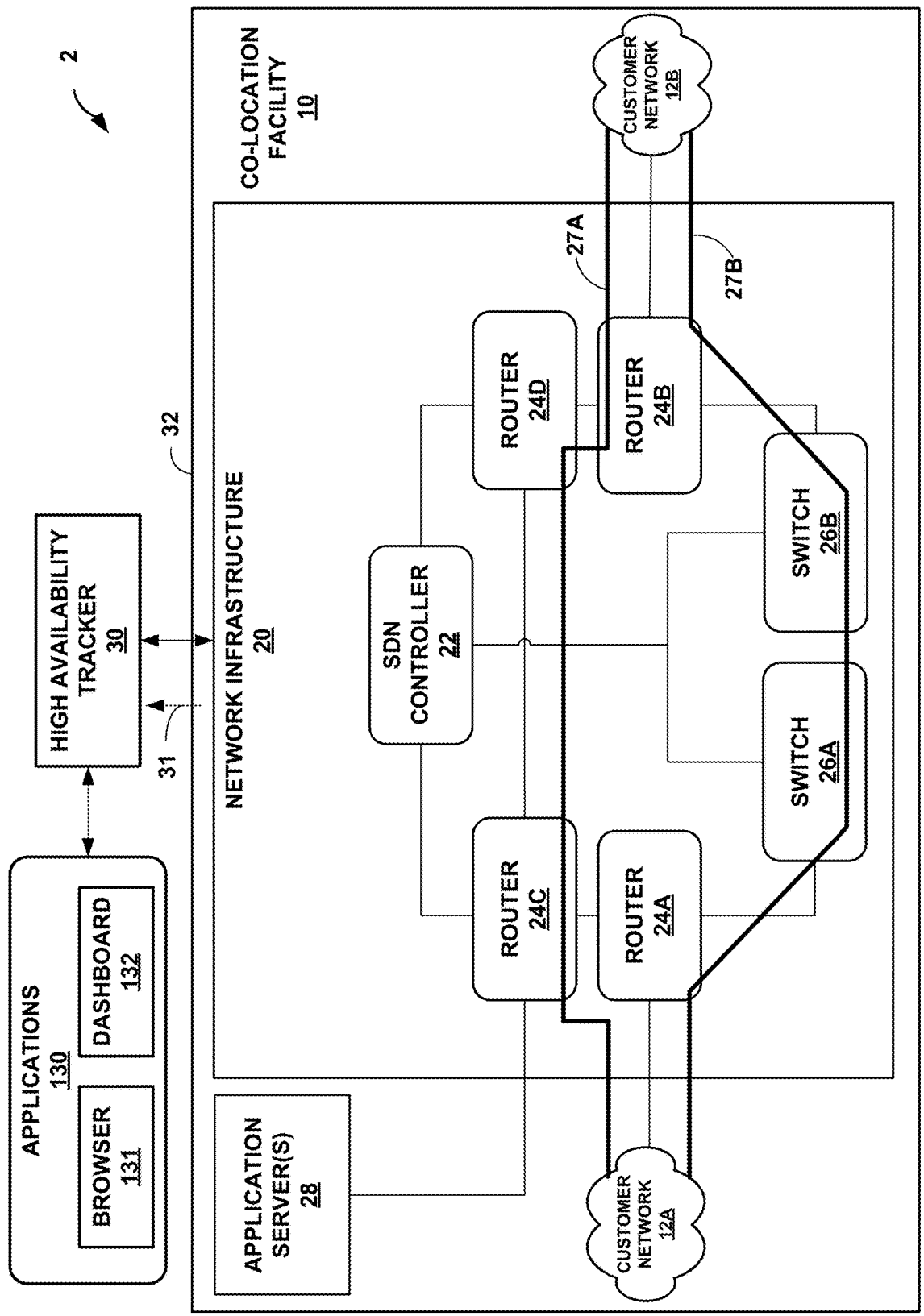
FIG. 1 is a block diagram that illustrates an interconnection system having a high availability tracker that offers high availability evaluation of network connection services of a co-location facility, in accordance with the techniques of the disclosure.

FIG. 1 is a block diagram that illustrates a system 2 having a high availability tracker 30 that offers high availability evaluation of network device services of a co-location facility 10, in accordance with the techniques of the disclosure. In the example of FIG. 1, system 2 depicts a network infrastructure 20 within a co-location facility 10 that provides network connection services to customer networks 12A-12B (collectively, "customers 12") to, for instance, exchange data with one another via the network infrastructure. Although FIG. 1 is shown with two customers, system 2 may include one or more additional customers co-located in the co-location facility 10 to receive network connection services from the co-location facility 10 provider. As used herein, the term "customer" indicates that the customer purchases co-location, interconnection and other network connection services from the co-location facility 10 provider, and receives such services by co-locating within the co-location facility 10 to, e.g. lease space and/or power to access services provided at co-location facility 10. System 2 includes network infrastructure 20 deployed by the co-location facility 10 provider within the co-location facility 10 to interconnect and provide other network connection services and application services to customer networks 12.

Customers that co-locate respective customer networks 12 may each represent a cloud service provider ("CSP"), a network connection service provider/carrier ("NSP"), and an enterprise. Customers 12 of co-location facility 10 may interconnect for such end-uses as service delivery, content delivery, financial services exchange, and transit and Internet access, to give just a few examples.

In co-location facility 10, space and power may be partitioned and leased to customers 12 in flexible increments in the form of cages (an area of a common floor space enclosed by a fence or other demarcation), cabinets, racks, suites (an enclosed room that is not part of a common floor space), or other space in which customers may situate their network equipment to provide and/or receive network connection services to/from other customer(s) co-located in the co-location facility 10 or, e.g., another co-location facility managed by the facility provider. Customers 12 may lease space within the co-location facility 10 in order to co-locate with other tenants for improved efficiencies over independent facilities as well as to interconnect network equipment with the network equipment of other tenants/customers within the co-location facility 10 or campus for reduced latency/jitter and improved reliability, performance, and security versus transport networks, among other reasons. Co-location facility 10 may host numerous customers, e.g., customers 12, and their network, server, and/or storage gear. Each of customers 12 may have particular reasons for choosing to co-locate at co-location facility 10, including capacity, geographical proximity, connecting to other customers, co-locating with other customers, and price.

Co-location facility 10 may provide one or more different types of network interconnection services via network devices of network infrastructure 20 between customers 12 co-located in co-location facility 10. For instance, co-location facility 10 may provide physical or "layer 1" (in the Open Systems Interconnection model (OSI Model)) interconnections between customers 12. Physical interconnections may include physical cross-connects that are established by category 5 or 6 (cat 5/6) cables, coaxial cables, and/or fiber optic cables, for instance. In some examples, co-location facility 10 may provide data link or "layer 2" (in the OSI Model) interconnections between customers 12 using an Ethernet exchange or cloud exchange. In some examples, co-location facility 10 may provide network and/or transport or "layer 3/4" (in the OSI Model) interconnections between customers 12. In some examples, co-location facility 10 may provide layer 3 interconnections (referred to an Internet Exchange) using Internet Protocol is the underlying layer 3 protocols. For example, co-location facility 10 may provide an Internet Exchange to allow routers of customers 12 to directly peer with one another using a layer 3 routing protocol, such as Border Gateway Protocol, to exchange routes for facilitating layer 3 traffic exchange to provide private peering. In some examples, co-location facility 10 may provide indirect layer 3 routing protocol peering whereby each of customers 12 announces its layer 3 routes to an autonomous system (AS) deployed by the co-location facility provider within the co-location facility network infrastructure 20 to provide private peering mediated by the AS. The AS may then relay these routes in conjunction with tunneling or other forwarding mechanisms to establish an interconnection between customers 12. In some examples, co-location facility 10 may provide indirect layer 3 routing protocol peering to facilitate service traffic exchange (referred to as a Cloud-based Services Exchange or, more simply, a Cloud Exchange). Additional description of exchanges may be found in U.S. patent application Ser. No. 15/099,407, filed Apr. 14, 2016, entitled "CLOUD-BASED SERVICES EXCHANGE," and U.S. patent application Ser. No. 15/001,766, filed Jan. 20, 2016, entitled "MULTI-CLOUD, MULTI-SERVICE DATA MODEL," the entire content of each of which being incorporated by reference herein. As used herein, an interconnection is an example of a network connection service provided by network devices of network infrastructure 20.

Network devices of network infrastructure 20 may provide network services in addition or in the alternative to interconnection services. For example, network infrastructure 20 may provide one or more of network address translation (NAT) services, firewall services, address allocation, deep packet inspection (DPI), subscriber management, billing and/or policy enforcement, content delivery networking (CDN), and other network services.

In some examples, network infrastructure 20 may include network devices such as SDN controller 22, application servers 28A-28B (collectively, "application servers 28"), routers 24A-24D (collectively, "routers 24"), and/or switches 26A, 26B (collectively, "switches 26") as well as network links connecting ports of the network device to provide customers 12 with access to network connection services. The number of network devices within network infrastructure 20 is illustrated for exemplary purposes and may include any number of network devices to provide customers 12 with access to network connection services of system 2. Each network device 24, 26 includes features to provide access to the network connection services. For example, router 24A may include hardware component features including control plane central processing unit ("CPU"), data plane CPU, control plane memory, data plane memory, ports, line cards, one or more power supplies, one or more fans, power bus, and other network device features. Network device features may further include logical components of the network device that provide support for a network connection service and utilizes hardware-based network device features to implement the network connection service.

Application servers 28 of data center 32 may provide applications for network service traffic exchanged via any of network service connections. Such applications may include network services such as stateful Internet Protocol Security (IPSec), stateful Firewall, stateful Network Address Translation (NAT), Point-to-Point Protocol over "X" (PPPoX), and Layer 2 Tunneling Protocol (L2TP), for example. Application servers 28 may in some cases operate as a gateway for network traffic exchanged between customer networks 12 and devices 24, 26 of network infrastructure 20. In some examples, application servers 28 include one or more load balancers for balancing incoming traffic from customer networks 12 and apportioning such traffic among routers 24 and switches 26. In some examples, application servers 28 provide portals such that devices on customer networks 12 may configure or receive data describing network connection services provided by network infrastructure 20. In some examples, such portals are browser-based (i.e., accessed through an interface provided by a web browser). In other examples, servers 28 provide one or more monitoring applications that allow a user to monitor status and configuration information for devices 24, 26 of network infrastructure 20. In further examples, servers 28 provide one or more service applications for configuring network connection services provided by devices 24, 26.

Application servers 28 may execute software that processes data from distributed client machines by interfacing with one or more databases at the backend of network infrastructure 20. In a multi-tier architecture comprising clients (tier 0), application servers (tier 1), and a database (tier 2), application servers 28 may implement the business logic of network infrastructure 20. Typically, each of application servers 28 execute custom programs written to perform a specific task defined by business requirements of the client. Each of application servers 28 may retrieve, process, and present data to the user interface. The user interface may be browser-based (e.g., accessed through a web browser), or through other means (e.g., a CLI interface).

One example of an application executing on application server 28 is an Internet search engine that allows a client machine to enter a query using a website of the search engine. In this example, the data input is the search performed by the client. The application executing on application server 28 receives the search input and may execute several operations on the search term. For example, the application performs queries on the search term to a web content database of the search engine. The application receives search result data from the web content database, orders the search result data, and presents the search result data to the client machines.

Another example of an application executing on application server 28 is an application that interacts with network devices, such as routers 24 and switches 26 to perform services for the network. For example, such an application may perform device discovery, IP address Management Applications (IPMAN), network configuration provisioning applications, and the like.

The network devices of network infrastructure 20 may be deployed in a network topology. Network resiliency features of network infrastructure 20 may include network topology device-level redundancy and path-level diversity. Device-level redundancy (when present) may reduce single points of failure using redundant chassis, redundant route processors, redundant fabrics, redundant line cards, redundant fans, redundant power supply modules, redundant power bus, etc., such that each router, switch, firewall, server, etc., of the network infrastructure 20 has redundancy. Path-level diversity (when present) denotes diverse physical paths through a network each connecting a pair of endpoints. Path level diversity may be achieved using such network resiliency features as multi-homing, internal resiliency, external resiliency, module connectivity diversity, equal-cost multipaths (ECMP), link aggregation groups (LAGs), diverse path computation, etc. Typically, the redundant paths are not merely multiple available paths dictated by routing protocols, but multiple available paths, each of which is qualified to guarantee that Application-level SLA requirements are satisfied, such as throughput requirements, latency requirements, jitter requirements, etc. Furthermore, such multiple, available paths should meet policy-based SLA requirements, such as requirements that Voice-over-Internet Protocol (VoIP) traffic should traverse a selected number of parallel paths out of many available choices or that data traffic should not traverse several pre-selected paths, etc.

Network resiliency features of network infrastructure 20 may also include network device features that facilitate resiliency at multiple ISO OSI-model or TCP/IP-model layers.

At OSI layer 1, resiliency features may include Synchronous Optical Networking (SONET) Automatic Packet Switching (APS), Resilient Packet Ring (RPR), Dense Wave-Division Multiplexing (DWDM), Fibre Channel, and Optical Protection Switching (OPS), for example.

At OSI layer 2, resiliency features may include link layer discovery protocol (LLDP), Link Aggregation Groups (LAG), Multichassis-LAG, Carrier Delay, Ethernet Operations, Administration, and Maintenance (OAM), and Multiprotocol Label Switching (MPLS) OAM.

At OSI layer 3, resiliency features may include protocol level resiliency features such as graceful restart features for routing protocols (e.g., Open Shortest Path First (OSPF), Intermediate System-to-Intermediate System (ISIS), BGP, etc.), Bidirectional Forwarding Detection (BFD), Traffic Engineering, IP Fast Reroute (FRR), and MPLS FRR. Other layer 3 resiliency features may include Internet Protocol (IP) Summarization, Stateful Switchover (SSO)/Non Stop Forwarding (NSF), In Service Software Upgrade (ISSU), Hot Standby Router Protocol (HSRP)/Gateway Load Balancing Protocol (GLBP)/Virtual Router Redundancy Protocol (VRRP), Process Restarts, or Software Error Recovery, for example.

At OSI layers 4-7 (alternatively considered the application and TCP layers in the TCP/IP-model), resiliency features of network and application infrastructure of a co-location facility may include server load balancing (such as layer 4 load balancing or layer 7 load balancing), stateful Network Address Translation (NAT), stateful IPSEC, Domain Name Service (DNS), Dynamic Host Configuration Protocol (DHCP), virtualization, application clustering, and so forth.

At the Network-level or application-level, resiliency features may include features such as dual-homing, Automatic Protection Switching (APS), Gigabit EtherChannel (GEC), Multichassis Link Aggregation Group (MC-LAG), Border Gateway Protocol (BGP) Prefix-Independent Convergence (PIC), Internet Protocol (IP) Fast Reroute (FRR), Traffic Engineering (TE) FRR, Multicast-only (MO) FRR, etc. Network services resiliency may include features such as intra-chassis redundancy, Stateful Internet Protocol Security (IPSec), Stateful Firewall, Stateful Network Address Translation (NAT), Point-to-Point Protocol over "X" (PPPoX), Layer 2 Tunneling Protocol (L2TP). Network services resiliency may further include features such as layer 4 load balancing, e.g., Windows Network Load Balancing, to check performance of deployed servers, or layer 7 load balancing to check performance of applications running on VMs on the servers.

The aforementioned resiliency features for each OSI layer described above are examples of resiliency features. However, it should be noted that best-practice recommendations exist for each OSI layer and are constantly updated and evolving. The techniques for high-availability evaluation as described herein may be applied to any type of implementation of resiliency features, including those not expressly set forth herein and/or resiliency features that may differ from the example resiliency features described above. Additionally, or in the alternative, the resiliency features may be grouped or categorized according to the TCP/IP-model of the network.

Network resiliency features supported by network devices may provide resilient network connection services configured by an operator (either directly or via a configuration device such as SDN controller 22). That is, network devices of network infrastructure 20 are individually configured to provide one or more network connection services. In some cases, multiple network devices are configured to cooperatively provide a single network connection service. In the example of FIG. 1, network infrastructure 20 is configured with one or more network connection services 27 to interconnect customer networks 12. Network connection services 27 in this example represent interconnection services (e.g., a virtual circuit for a layer 2 or layer 3 interconnection). Network connection services 27 may include one or more services that aid customer network 12A and customer network 12B in connecting with one another or exchanging traffic with one another. FIG. 1 illustrates example network connection services 27A-27B. Devices of network infrastructure 20 may provide virtual network services such as firewall and security services, carrier grade network address translation (CG-NAT), media optimization (voice/video), IPSec/VPN services, deep packet inspection (DPI), HTTP filtering, session border controller (SBC), counting, accounting, charging, and load balancing of packet flows or other types of services applied to network traffic exchanged between customer networks 12 using network connection services 27.

In accordance with techniques of this disclosure, high availability tracker 30 is an application executed by one or more computing devices deployed by the co-location 10 facility provider to evaluate the high availability of the network infrastructure 20 of co-location facility 10 across multiple ISO OSI-model or TCP/IP-model layers of the network device. The high availability tracker 30 applies, for each device 24, 26 in the network infrastructure 20, a high availability metric to each network redundancy or resiliency feature of the respective device to determine high availability rating for each device feature of the respective device across a plurality of ISO OSI-model or TCP/IP-model layers of the network device. High availability tracker 30 aggregates the high availability ratings for each device feature of each device to determine an overall high availability rating for each device.

In one example, high availability tracker 30 applies numerical weights to a high availability capability score (e.g., an unweighted high availability capability score) for each device feature to determine a weighted high availability score for each device. In another example, high availability tracker 30 applies binary criteria (e.g., "YES, the feature supports high availability" or "NO, the feature does not support high availability") to each device feature, and determines that a device is highly available if every feature is determined to support high availability, and that the device is not highly available if any feature is determined not to support high availability. High availability tracker 30 aggregates the overall high availability rating for each device 24, 26 to determine a high availability rating for each network connection service provided by devices 24, 26. Thus, high availability tracker 30 determines an overall high availability capability score (or, more simply, "high availability score") for each network connection service offered by co-location facility 10 across multiple ISO OSI-model or TCP/IP-model layers with granularity down to specific devices and specific device features. High availability tracker 30 outputs, for display to a dashboard 132, the high availability rating for each network connection service in the one or more co-location facilities. Using this information, an administrator may rapidly determine whether a network connection service has high availability, and if not, what devices and/or device features should be upgraded to ensure that the network connection service may be considered high availability. Additional information with regards to determining the high availability score is provided in FIGS. 7 and 8, discussed hereinafter.

High availability tracker 30 may obtain high availability data using one or more monitoring protocols 32 (e.g., SNMP, Nedlow, Netconf, or other network device monitoring protocol) to obtain configuration and performance information for network connection services and network devices 24, 26 of network infrastructure 20. As one example, high availability tracker 30 may implement monitoring protocol 32 (e.g., SNMP) to automatically collect configuration information about the devices of network infrastructure 20, such as router 24A. When high availability tracker 30 performs an evaluation of the high availability of network connection services of network infrastructure 20, high availability tracker 30 may use monitoring protocol 32 to obtain configuration data of different network device features and configuration information of router 24A. For example, in response to instructions from high availability evaluation tracker 30 or monitoring protocol 32, router 24A may execute an automation script. The automation script causes router 24A to compile and organize information on its current configuration of features, including data describing state information, driver versions, network protocols, provisioning information, routing and forwarding information. Further, the data may indicate whether the network device possesses a power supply redundancy, whether the network device possesses a cooling fan redundancy, whether the network device comprises a chassis comprising a dual-route processor, whether the network device is configured to use one of a Hot Standby Router Protocol (HSRP), a Virtual Router Redundancy Protocol (VRRP), or a Gateway Load Balancing Protocol (GLBP), whether a routing protocol of the network device implements a static address, a Border Gateway Protocol (BGP), or an Open Shortest Path First (OSPF) protocol, whether the network device is configured to implement Bidirectional Forwarding Detection (BFD) or whether the network device is configured to implement one of Internet Protocol (IP) Fast Reroute Framework (FRR) or Multiprotocol Label Switching (MPLS) FRR. For example, the automation script may cause router 24A to indicate, via monitoring protocol 32, to high availability tracker 30 that router 24A has one power supply, three cooling fans, and implements BGP protocol by transmitting such configuration to high availability tracker 30.

In some examples, the automation script causes the network device to Internet Control Message Protocol (ICMP) Ping or Traceroute commands to assess the network reachability of the network device. For example, the automation script may cause the network device to execute a ping command to every other target device in the network topology. Further, the automation script may cause the network device to execute a multi-path Traceroute command to every other target device in the network topology. Further, the automation script may cause the network device to execute a Verify Traceroute to reveal the presence of multiple paths from a select source to a target destination. In some examples, the automation script causes the network device to use traffic monitoring tools to extract average link utilization of active paths as well as parallel paths. In some examples, the automation script causes the network device to extract latency data for every leg of each path to each other network device as well as latency data for each end-to-end path to each other network device. In some examples, the automation script, when executed on a switch, causes the switch to execute commands to show Link Layer Discovery Protocol (LLDP) neighbors to verify the availability of multiple links to reach the next switch. Furthermore, in some examples, the automation script causes the network device to access Netflow collector data to access application data from packet information flowing through network links. In other examples, the automation script causes the network device to execute "show" commands which output the configuration information for the network device, such as software configuration, hardware configuration, driver information, and the configuration of device settings, options, features, and peripherals.

In some examples, high availability tracker 30 instructs each of network devices 24, 26 to execute the automation script such that each network device compiles and organizes information on its current configuration of features, and transmits such information to high availability tracker 30. High availability tracker 30 may aggregate the collected data for each of devices 24, 26. High availability tracker 30 may apply a high availability metric to this aggregated information to determine the high availability of the network connection services of network infrastructure 20 across one or more ISO OSI-model or TCP/IP-model layers. As described herein, a high availability metric is a minimum standard required for a particular network device feature to provide high availability. By "applying" the high availability metric, high availability tracker 30 determines whether the corresponding network device feature satisfies the minimum standard set by the high availability metric. In other words, high availability tracker 30 determines whether the network device feature of the network device provides redundancy and resiliency such that the network device feature may be deemed "highly available." In the above example, high availability tracker 30 applies a high availability metric for power supplies to router 24A. By applying the high availability metric, high availability tracker 30 determines that router 24A is not highly available because router 24A possesses only a single power supply, and therefore does not have power supply redundancy. Thus, high availability tracker 30 applies a unique metric to each feature described by the data received from devices 24, 26 to determine an overall high availability capability score for each network device feature of the network device.

Examples of high availability metrics include determining whether router 24A has redundant hardware components for each feature. For example, a high availability metric for a power supply of router 24A may be to require that router 24A has two power supplies, so that in the event of a failure of one of the two power supplies, router 24A remains operation. Another high availability metric for a power supply of router 24A may be to require that router 24A has at least three power supplies, each of which can independently deliver a particular wattage. An example of a high availability metric for a fan of router 24A may be to require that router 24A has at least two fans. An example of a high availability metric for software of router 24A may be to require that router 24A has a particular version of a driver or software. Such a version may be a version that an administrator has selected for stability, or the most recent version available.

An example of a high availability metric for a network path between router 24A and router 24B may be to require that at least two paths exist between router 24A and router 24B (e.g., a first path may be from router 24A directly to router 24B, while a second path may be from router 24A to router 24C, from router 24C to router 24D, and from router 24D to router 24B). The example high availability metric for a network path between router 24A and router 24B may further require that the at least two paths satisfy particular policy-based SLA requirements, such as a maximum number of hops, a minimum traffic bandwidth, a maximum transit time for traffic between the two routers, a permitted traffic type, etc. While the foregoing provides some examples of high availability metrics, the techniques of the disclosure contemplate setting high availability metrics for any feature of a network device that may be designed to have redundancy or resiliency.

In one example, high availability tracker 30 applies a high availability metric to each device 24, 26 for a plurality of ISO OSI model layers, such as the Physical Layer (Layer 1) model layer; the Data Link Layer (Layer 2) model layer; the Network Layer (Layer 3) model layer; the Transport Layer (Layer 4) model layer; the Session Layer (Layer 5) model layer; the Presentation Layer (Layer 6) model layer; and the Application Layer (Layer 7) model layer. In another example, high availability tracker 30 applies a high availability metric to each device 24, 26 for a plurality of TCP/IP-model layers, such as the Link model layer; Internet model layer; Transport model layer; and Application model layer.

In one example, high availability tracker 30 applies a high availability metric to each feature of network devices 24, 26 to determine a network protocol resiliency across OSI model layer 2 and layer 3. In this example, the high availability tracker 30 applies high availability evaluation metrics (or, more simply, "high availability metrics") to configuration and driver information of each network device 24, 26 to determine a score for network protocol resiliency across OSI model layer 2 and layer 3. In some examples, high availability tracker 30 applies a unique metric to each device feature of a plurality of device features of each of devices 24, 26, to arrive at a unique high availability score for each device feature of the plurality of device features of each of devices 24, 26. For example, high availability tracker 30 may determine, for each of devices 24, 26, that each hardware component of a plurality of hardware components of a network device possesses an appropriate driver for the hardware component. Similarly, high availability tracker 30 may determine, for each of devices 24, 26, that each software component of a plurality of software components of a network device possesses an appropriate software version for the software component. In some examples, the driver or software version is the latest available driver or software version. In other examples, the driver or software version is a driver or software version selected by a network administrator for its compliance with a network policy of co-location facility 10, its stability, or its configurability.

In another example, high availability tracker 30 applies a high availability metric to a network topology of the network infrastructure 20 to determine a network topology resiliency across OSI model layer 2 and layer 3. In this example, the high availability tracker 30 applies high availability evaluation metrics to routing and switching data from each network device 24, 26 to determine a score for network topology resiliency across OSI model layer 2 and layer 3.

For example, high availability tracker 30 may determine a high availability score for each available parallel path from a network device. In one example, a multi-path Traceroute indicates availability of two paths from a source node to a destination node. Further traffic monitoring tools indicate that both of these paths have an average utilization level of more than 50%. If one of the paths fails, the alternate path may not be able to absorb the load of the failing path (i.e., because both paths already have a utilization over 50%. Thus, if one of the paths fails, significant traffic loss may occur. Accordingly, high availability tracker 30, by taking dynamic snapshots of network into account, may determine that the paths do not have high availability even though redundant traffic paths exist.

In a further example of the above scenario, high availability tracker 30 may determine that a policy requirement dictates that, even if the first path fails, a second path may not be used for traffic of a particular network connectivity service. Thus, high availability tracker 30 determines that the particular network connectivity service does not have high availability, even though the network topology provides redundant paths between two devices. Thus, high availability tracker 30 provides information regarding the high availability at a network connection services level that may not be understood merely by examining the number of parallel paths, some of which may not satisfy requirements for an Application-level SLA.

High availability tracker 30 uses the overall high availability capability scores for each of the network device features of each of the network devices 24, 26 to determine a high availability score for the one or more network connection services supported by the network devices 24, 26. In one example, high availability tracker 30 adds the high availability capability score for each of the network device features of each of the network devices 24, 26, wherein the sum of the high availability capability scores is the high availability score for the one or more network connection services. In another example, high availability tracker 30 determines whether each high availability capability score for each of the network device features of each of the network devices 24, 26, exceeds a threshold score. Upon determining that one or more high availability capability scores fail to meet or exceed the threshold score, the high availability tracker 30 assigns a failing value for the high availability score for the one or more network connection services. Similarly, upon determining that one or more high availability capability scores meets or exceeds the threshold score, the high availability tracker 30 assigns a passing value for the high availability score for the one or more network connection services. Thus, in one example, high availability tracker 30 calculates a granular, numerical value for high availability score for the one or more network connection services, while in another example, high availability tracker 30 calculates a binary passing/failing value for the high availability score for the one or more network connection services.

High availability tracker 30 outputs the high availability score for the one or more network connection services to applications 130 for display to a user. In one example, high availability tracker 30 arranges the high availability score for the one or more network connection services such that a unique high availability score is presented for each type of network connection service and for each co-location facility 10. For example, high availability tracker 30 may arrange the high availability score for the one or more network connection services in a grid representation such that each row of the grid indicates a different type of network connection service, and each column of the grid indicates a different co-location facility 10. An example interface that presents this arrangement is shown in FIG. 4.

Application(s) 130 represents at least one application that communicates with high availability tracker 30 to present high availability information to a customer. Application(s) 130 represent client-side software for interfacing with high availability tracker 30 and may include a dashboard 132 presented via, e.g., web browser 131. In other examples, application 130 includes a customer portal, customer applications, and/or a console such as a command-line interface or graphical user interface. Users or clients of application(s) 130 may include customers associated with customer networks 12, e.g., enterprise customers, cloud service and content providers, carriers, network connection service providers (NSPs). Users of application(s) 130 may also include operators/administrators of the co-location facility 10 provider. In some examples, application(s) 130 and high availability tracker 30 may represent different functions or modules of the same application.

Thus, co-location facility 10 may perform a granular assessment to determine which services and products in the network infrastructure 20 do not have high availability. Further, co-location facility 10 may determine whether specific pieces of hardware, software, and network topology need to be upgraded or redesigned. Additionally, using the high availability evaluation tracker 30, co-location facility 10 may determine whether specific components need configuration changes.

Further, co-location facility 10 may dynamically track high availability across each device 24, 26 in the network infrastructure 20 to account for changes in the topology of network infrastructure 20 as additional devices 24, 26 are added and removed from the network, as well as to account for changes to each device 24, 26 due to the insertion or removal of hardware components and/or modifications to the device's control software. For example, each time a device 24, 26 is added to or removed from network infrastructure 20, high availability tracker 30 issues instructions to devices 24, 26 causing devices 24, 26 to execute the automation script. The automation script, in turn, causes devices 24, 26 to compile and organize information on its current configuration of features and transmit such information to high availability tracker 30 as configuration report messages 31. High availability tracker 30 may use this information to re-evaluate the high availability of each network connection service of network infrastructure 20 such that co-location facility 10 may dynamically track high availability across each device 24, 26 in the network infrastructure 20 each time the network topology changes. Each of configuration report messages 31 may represent a Command-Line Interface (CLI) or other human-readable output, or a machine-readable file or message.

Figure 2:
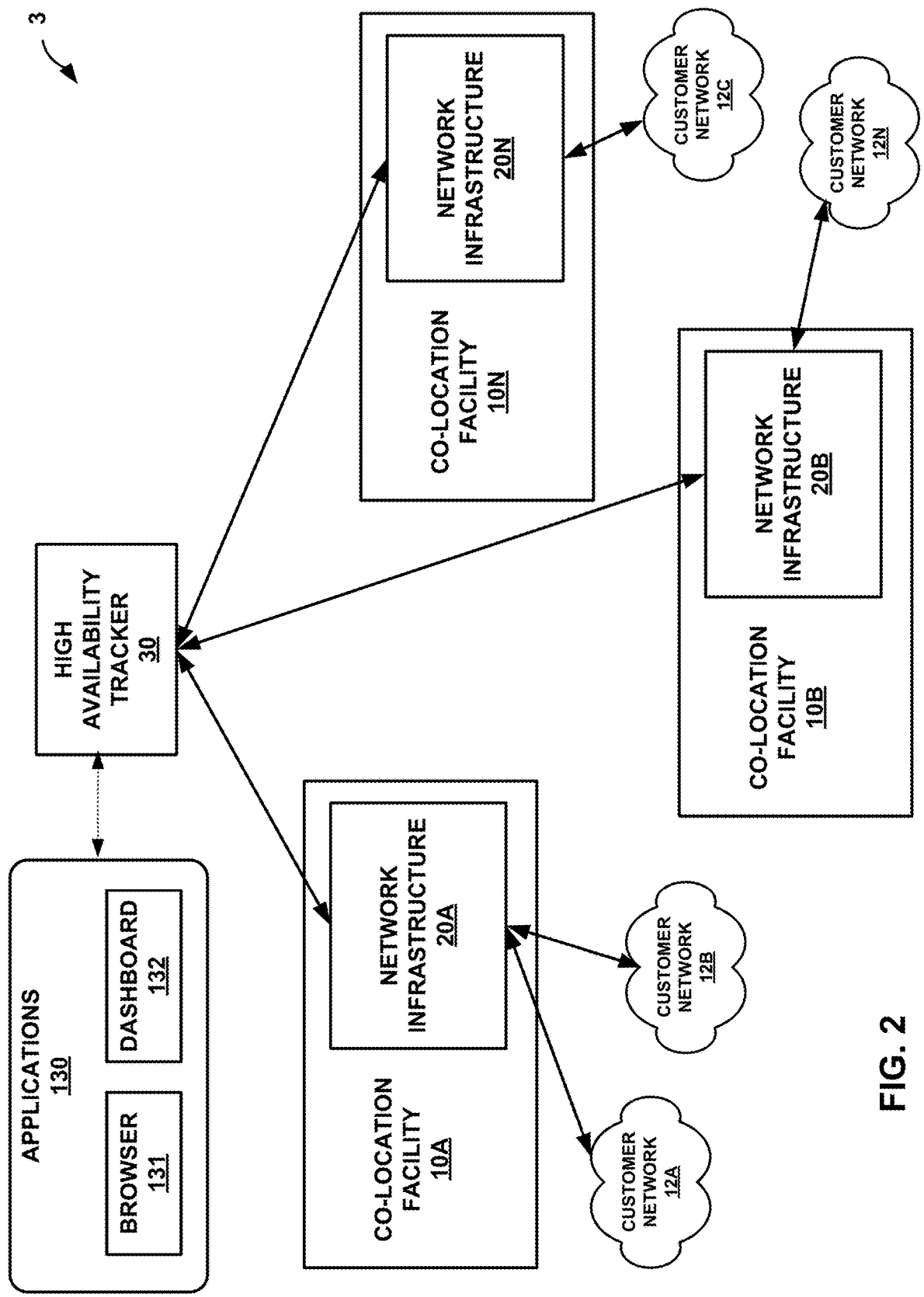
FIG. 2 is a block diagram that illustrates an interconnection system having a high availability tracker that offers high availability evaluation of network connection services of a plurality of co-location facilities, in accordance with the techniques of the disclosure.

Although shown as administering a single co-location facility 10, high availability tracker 30 may perform high availability evaluation for multiple different co-location facilities, as depicted in FIG. 2 below. Alternatively, or additionally, multiple separate instances of the high availability tracker 30 may perform high availability evaluation for respective multiple different co-location facilities.

As a result of the techniques of this disclosure, the co-location facility 10 provider may evaluate the high availability of each network connection service or product across one or more ISO OSI-model or TCP/IP-model layers of the network device to improve the assessment accuracy of network device reliability and redundancy across network infrastructure 20. Further, in some examples, the techniques may provide resource-specific indications of areas that require additional network device resources to address deficiencies in reliability or redundancy.

FIG. 2 is a block diagram that illustrates a system 3 having a high availability tracker 30 that offers high availability evaluation of network infrastructures 20A-20N (collectively, "network infrastructures 20") of a plurality of co-location facilities 10A-10N (collectively, "co-location facilities 10") in accordance with the techniques of the disclosure. Each of co-location facilities 10 and network infrastructures 20 may function in a substantially similar fashion as the co-location facility 10 and network connection service 20 of FIG. 1. As described herein, "N" may represent any number of co-location facilities 10 and network infrastructures 20.

High availability tracker 30 performs an evaluation of the high availability of each of the plurality of network connection services of the plurality of co-location facilities 10 across multiple ISO OSI-model or TCP/IP-model layers. In some examples, high availability tracker 30 applies, for each device (not depicted) in each network infrastructure 20, a high availability metric to each network redundancy or resiliency feature of the respective device to determine high availability rating for each device feature of the respective device across a plurality of ISO OSI-model or TCP/IP-model layers. High availability tracker 30 aggregates the high availability ratings for each device feature of each device to determine an overall high availability rating for each device as described above with respect to FIG. 1. High availability tracker 30 aggregates the overall high availability rating for each device to determine a high availability rating for each network connection service provided by the network devices of a particular network infrastructure 20 (e.g., network infrastructure 20A) of the plurality of network infrastructure 20. Thus, high availability tracker 30 determines an overall high availability score for each network connection service offered by each co-location facility 10 across multiple ISO OSI-model or TCP/IP-model layers with granularity down to specific devices and specific device features. High availability tracker 30 presents, for display on a dashboard 132, the high availability rating for each network connection service in the one or more co-location facilities 10. Using this information, an administrator may rapidly determine whether a network connection service within a specific network infrastructure 20 of a specific co-location facility 10 is highly available, and if not, what devices and/or device features should be upgraded to ensure that the network connection service may become highly available.

As described above, high availability tracker 30 may obtain high availability data using one or more monitoring protocols 32 (e.g., SNMP, Nedlow, Netconf, or other network device monitoring protocol) to track configuration information for network connection services and network devices within each of network infrastructures 20. As one example, high availability tracker 30 may implement monitoring protocol 32 (e.g., SNMP) to automatically collect configuration information about the devices of each of network infrastructures 20. When high availability tracker 30 performs an evaluation of the high availability of network connection services of, for example, network infrastructure 20A, high availability tracker 30 may use a monitoring protocol to obtain configuration data of different network device features. For example, a router within network infrastructure 20A may collect and organize information on its current configuration of features, including data describing state information, driver versions, network protocols, provisioning information, routing and forwarding information. Further, the data may indicate whether the network device possesses a power supply redundancy, whether the network device possesses a cooling fan redundancy, whether the network device comprises a chassis comprising a dual-route processor, whether the network device is configured to use one of a Hot Standby Router Protocol (HSRP), a Virtual Router Redundancy Protocol (VRRP), or a Gateway Load Balancing Protocol (GLBP), whether a routing protocol of the network device implements a static address, a Border Gateway Protocol (BGP), or an Open Shortest Path First (OSPF) protocol, whether the network device is configured to implement Bidirectional Forwarding Detection (BFD) or whether the network device is configured to implement one of Internet Protocol (IP) Fast Reroute Framework (FFR) or Multiprotocol Label Switching (MPLS) FFR. For example, a router of network infrastructure 20A may indicate, via a monitoring protocol, to high availability tracker 30 that the router has one power supply, three cooling fans, and implements BGP protocol.

As described above, high availability tracker 30 aggregates the collected data for each of the network devices of each of network infrastructures 20 of each of co-location facilities 10. High availability tracker 30 applies a high availability metric to this aggregated information to determine the high availability, across one or more ISO OSI-model or TCP/IP-model layers, of each of the network connection services of each of the plurality of network infrastructures 20 of co-location facilities 10. In the above example, high availability tracker 30 applies a high availability metric for power supplies to routers of each of network infrastructures 20. By applying the high availability metric, high availability tracker 30 determines that a router of network infrastructure 20A is not highly available because the router possesses only a single power supply, and therefore does not have power supply redundancy. Accordingly, high availability tracker 30 applies a unique metric to each feature described by the data received from the each of the network devices to determine an overall high availability capability score for the network device feature. High availability tracker 30 may further determine that network infrastructure 20A is not highly available because not all of the network devices of network infrastructure 20A are highly available.

High availability tracker 30 uses the overall high availability capability scores for each of the network device features of each of the network devices to determine a high availability score for the one or more network connection services supported by the network devices. Further, high availability tracker 30 may use the overall high availability capability scores for each of the network device features of each of the network devices to determine a high availability score for each network infrastructure 20 of the plurality of network infrastructures 20 offered by co-location facilities 10. In one example, high availability tracker 30 adds the high availability capability score for each of the network device features of each of the network devices 24, 26, wherein the sum of the high availability capability scores is the high availability score for the one or more network connection services. In another example, high availability tracker 30 determines whether each high availability capability score for each of the network device features of each of the network devices exceeds a threshold score. Upon determining that one or more high availability capability scores fail to meet or exceed the threshold score, the high availability tracker 30 assigns a failing value for the high availability score for the one or more network connection services. Similarly, upon determining that one or more high availability capability scores meets or exceeds the threshold score, the high availability tracker 30 assigns a passing value for the high availability score for the one or more network connection services. Thus, in one example, high availability tracker 30 calculates a granular, numerical value for high availability score for the one or more network connection services, while in another example, high availability tracker 30 calculates a binary passing/failing value for the high availability score for the one or more network connection services.

High availability tracker 30 outputs the high availability score for the one or more network connection services to applications 130 for display to a user. In one example, high availability tracker 30 arranges the high availability score for the one or more network connection services such that a unique high availability score is presented for each network connection service, each network infrastructure 20, and each co-location facility 10. For example, high availability tracker 30 may arrange the high availability score for the one or more network connection services in a grid representation such that each row of the grid indicates a different type of network connection service, and each column of the grid indicates a different co-location facility 10.

Application(s) 130 represents at least one application that communicates with high availability tracker 30 to present high availability information to a customer. Application(s) 130 represent client-side software for interfacing with high availability tracker 30 and may include a web browser 131 or a dashboard 132. In other examples, application 130 includes a customer portal, customer applications, and/or a console such as a command-line interface or graphical user interface. Users or clients of application(s) 130 may include customers associated with customer networks 12, e.g., enterprise customers, cloud service and content providers, carriers, network connection service providers (NSPs). Users of application(s) 130 may also include operators/administrators of the co-location facility 10 provider. In some examples, application(s) 130 and high availability tracker 30 may represent different functions or modules of the same application.

Thus, high availability tracker 30 may perform a granular assessment to determine which services and products in a plurality of network infrastructures 20 across a plurality of co-location facilities 10 do not have high availability. Further, high availability tracker 30 may determine whether specific pieces of hardware, software, and network topology need to be upgraded or redesigned across a plurality of co-location facilities 10. Additionally, high availability evaluation tracker 30 may determine whether specific components across specific co-location facilities 10 need configuration changes. Further, high availability evaluation tracker 30 may dynamically track high availability across each device in a plurality of network infrastructures 20 of a plurality of co-location facilities 10 to account for changes in the topology of network infrastructures 20 of the plurality of co-location facilities 10 as additional devices are added and removed from each of the network infrastructures 20, as well as to account for changes to each device due to the insertion or removal of hardware components and/or modifications to the device's control software.

In other words, in response to a hardware or software change within one network infrastructure 20 of one co-location facility 10, high availability evaluation tracker 30 may, via a monitoring protocol, instruct each network device in each network infrastructure 20 of each co-location facility 10 of the plurality of co-location facilities 10 to transmit, to high availability evaluation tracker 30, configuration and status information for the network device as described above. High availability evaluation tracker 30 performs an analysis, as described above, to determine the high availability of each network device within each network infrastructure 20 of each co-location facility 10 of the plurality of co-location facilities 10, to identify any deficiencies in high availability across the plurality of co-location facilities 10.

In some examples, applications 130, via dashboard 132, present this information to a user for display. The user may use this information to upgrade the router of network infrastructure 20A to cause network infrastructure 20A to become highly available. Alternatively, the user may move one or more customers and applications onto another network infrastructure 20B that is highly available to facilitate consistent, highly available service to the customers and applications.

The example of FIG. 2 describes a single instance of high availability evaluation tracker 30 as administering multiple different co-location facilities. Alternatively, or additionally, multiple separate instances of the high availability evaluation tracker 30 may perform high availability evaluation for respective multiple different co-location facilities 10.

As a result of the techniques of this disclosure, high availability evaluation tracker 30 may evaluate, across one or more ISO OSI-model or TCP/IP-model layers, the high availability of each network connection service or product across a plurality of network infrastructures 20 in a plurality of co-location facilities 10 to improve the assessment accuracy of network device reliability and redundancy across the plurality of co-location facilities 10. Further, in some examples, the techniques may provide resource-specific indications of areas that require additional network device resources to address deficiencies in reliability or redundancy.

Figure 3:
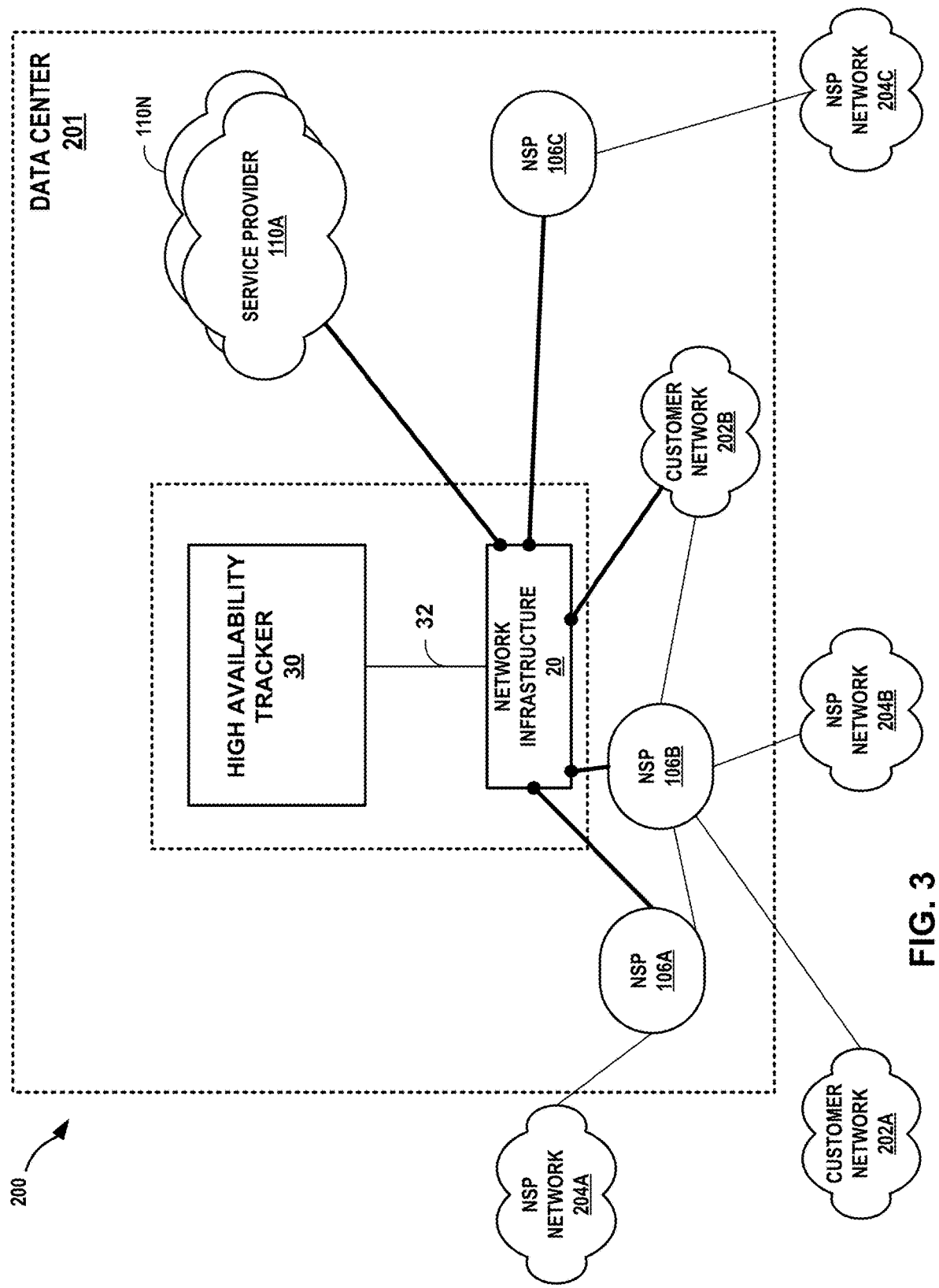
FIG. 3 is a block diagram that illustrates an example co-location facility that provides an operating environment for a co-location facility, and a high availability tracker that performs high availability evaluation of network connection services of the co-location facility, in accordance with techniques of the disclosure.

FIG. 3 is a block diagram that illustrates an example co-location facility 200 that provides an operating environment for a data center 201, and a high availability tracker 30 that performs high availability evaluation of network connection services of the co-location facility 200, in accordance with techniques of the disclosure. Co-location facility 200 may represent an example instance of any of co-location facilities 10 of FIGS. 1-2. Co-location facility 200 allows a corresponding one of customer networks 202A, 202B and NSP networks 204A-204C (collectively, "'private' or 'carrier' networks 204") of any NSPs 106A-106C or other customers to be directly cross-connected, via a layer 2 (L2) or layer 3 (L3) connection to any other customer network and/or to any of service providers 110A-110N, thereby allowing exchange of service traffic among the customer networks and service providers 110. Data center 201 may be entirely located within a centralized area, such as a warehouse or localized co-location facility complex, and provide power, cabling, security, and other services to NSPs, customers, and service providers that locate their respective networks within the data center 201 (e.g., for co-location) and/or connect to the data center 201 by one or more external links.

Co-location facility 200 includes network infrastructure and an operating environment by which customers 202 may receive services from one or more service providers 110 via interconnections. An interconnection as described herein may refer to, e.g., a physical crossconnect, an Ethernet connection such as a Layer 2 VPN or virtual private LAN (e.g., ELINE, E-LAN, E-TREE, or E-Access), an Internet exchange-based interconnection in which respective routers of interconnected customers directly peer and exchange layer 3 routes for service traffic exchanged via network infrastructure 20, and a cloud exchange in which customer routers peer with network infrastructure 20 (or "provider") routers rather than directly with other customers. Co-location facility 200 may provide, to enterprise customers, interconnection services to cloud services. That is, an interconnection service by co-location facility 200 provides access to services provided by service providers 110.

For interconnections at layer 3 or above, customers 202 may receive services directly via a layer 3 peering and physical connection to one of co-location facility exchange points or indirectly via one of NSPs 106. NSPs 106 provide "transit" by maintaining a physical presence within co-location facility 200 and aggregating layer 3 access from one or more customers 202. NSPs 106 may peer, at layer 3, directly with one or more co-location facilities 200 and in so doing offer indirect layer 3 connectivity and peering to one or more customers 202 by which customers 202 may obtain services from the co-location facility 200.

In instances in which co-location facility 200 offers a cloud exchange, network infrastructure 20 may be assigned a different autonomous system number (ASN). Network infrastructure 20 is thus a next hop in a path vector routing protocol (e.g., BGP) path from service providers 110 to customers 202. As a result, co-location facility 200 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers 202. In other words, co-location facility 200 may internalize the eBGP peering relationships that service providers 110 and customers 202 would maintain on a pair-wise basis. Instead, a customer 202 may configure a single eBGP peering relationship with co-location facility 200 and receive, via the co-location facility, multiple services from one or more service providers 110. While described herein primarily with respect to eBGP or other layer 3 routing protocol peering between co-location facility points and customer, NSP, or service provider networks, the co-location facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 202B in FIG. 2 is illustrated as having contracted with the co-location facility provider for co-location facility 200 to directly access layer 3 services via co-location facility 200 and also to have contracted with NSP 106B to access layer 3 services via a transit network of the NSP 106B. Customer network 202A is illustrated as having contracted with NSP 106B to access layer 3 services via a transit network of NSP 106B. The contracts described above may be instantiated in network infrastructure of the co-location facility 200 by L3 peering configurations within switching devices of NSPs 106 and co-location facility 200 and L3 connections, e.g., layer 3 virtual circuits, established within co-location facility 200 to interconnect service provider 110 networks to NSPs 106 networks and customer 202 networks, all having at least one port offering connectivity within co-location facility 200.

In some examples, service providers 110 may be cloud service providers. Service providers 110 may offer such services as Software-as-a-Service (SaaS), Platform-aaS (PaaS), Infrastructure-aaS (IaaS), Virtualization-aaS (VaaS), and data Storage-aaS (dSaaS), via the co-location facility 200. Network connection service providers 106 may each represent a network connection service provider that is associated with a transit network by which network subscribers of the NSP 106 may access services offered by service providers 110 via the co-location facility 200. In general, customers of service providers 110 may include network carriers, large enterprises, managed service providers (MSPs), as well as other customers generally seeking any of the SaaS, PaaS, IaaS, VaaS, and dSaaS services offered by the service providers 110.

In the example of FIG. 3, high availability tracker 30 performs an evaluation of the high availability of the network infrastructure 20 of co-location facility 200 across multiple ISO OSI-model or TCP/IP-model layers. The high availability tracker 30 applies a high availability metric to each device feature of each device in the network infrastructure 20 and determines a high availability rating for each device across multiple ISO OSI-model or TCP/IP-model layers. based on the high availability ratings for each device, high availability tracker 30 determines an overall high availability score for each network connection service offered by the network devices of co-location facility 10 across multiple ISO OSI-model or TCP/IP-model layers. High availability tracker 30 presents, for display on a dashboard, the high availability rating for each network connection service in the one or more co-location facilities.

High availability tracker 30 may obtain high availability data using one or more monitoring protocols 32 (e.g., SNMP, Netflow, Netconf, or other network device monitoring protocol) to track configuration information for network connection services and network devices of network infrastructure 20. As one example, high availability tracker 30 may implement monitoring protocol 32 (e.g., SNMP) to automatically collect configuration information about the devices of network infrastructure 20. When high availability tracker 30 performs an evaluation of the high availability of network connection services of network infrastructure 20, high availability tracker 30 may use monitoring protocol 32 to obtain configuration data of different network device features and configuration information of various network devices of network infrastructure 20. For example, in response to instructions from high availability evaluation tracker 30 or monitoring protocol 32, a network device may execute an automation script that causes the network device to compile and organize information on its current configuration of features, including data describing state information, driver versions, network protocols, provisioning information, routing and forwarding information. Further, the data may indicate whether the network device possesses a power supply redundancy, whether the network device possesses a cooling fan redundancy, whether the network device comprises a chassis comprising a dual-route processor, whether the network device is configured to use one of a Hot Standby Router Protocol (HSRP), a Virtual Router Redundancy Protocol (VRRP), or a Gateway Load Balancing Protocol (GLBP), whether a routing protocol of the network device implements a static address, a Border Gateway Protocol (BGP), or an Open Shortest Path First (OSPF) protocol, whether the network device is configured to implement Bidirectional Forwarding Detection (BFD) or whether the network device is configured to implement one of Internet Protocol (IP) Fast Reroute Framework (FFR) or Multiprotocol Label Switching (MPLS) FFR. For example, the automation script may cause the network device to indicate, via monitoring protocol 32, to high availability tracker 30 that the network device has one power supply, three cooling fans, and implements BGP protocol by transmitting such configuration to high availability tracker 30. As described above, high availability tracker 30 aggregates the collected data for each of the network devices of network infrastructure 20 executing the automation script. High availability tracker 30 applies a high availability metric to this aggregated information to determine the high availability of the network connection services provided by the network devices of network infrastructure 20 across one or more ISO OSI-model or TCP/IP-model layers.

High availability tracker 30 uses the overall high availability capability scores for each of the network device features of each of the network devices to determine a high availability score for the one or more network connection services supported by the network devices. In one example, high availability tracker 30 adds the high availability capability score for each of the network device features of each of the network devices, wherein the sum of the high availability capability scores is the high availability score for the one or more network connection services. In another example, high availability tracker 30 determines whether each high availability capability score for each of the network device features of each of the network devices, exceeds a threshold score. Upon determining that one or more high availability capability scores fail to meet or exceed the threshold score, the high availability tracker 30 assigns a failing value for the high availability score for the one or more network connection services. Similarly, upon determining that one or more high availability capability scores meets or exceeds the threshold score, the high availability tracker 30 assigns a passing value for the high availability score for the one or more network connection services. Thus, in one example, high availability tracker 30 calculates a granular, numerical value for high availability score for the one or more network connection services, while in another example, high availability tracker 30 calculates a binary passing/failing value for the high availability score for the one or more network connection services.

High availability tracker 30 outputs the high availability score for the one or more network connection services for display to a user. In one example, high availability tracker 30 arranges the high availability score for the one or more network connection services such that a unique high availability score is presented for each network connection service and for each co-location facility 10. For example, high availability tracker 30 may arrange the high availability score for the one or more network connection services in a grid representation such that each row of the grid indicates a different type of network connection service, and each column of the grid indicates a different co-location facility 10. In some examples, users of high availability tracker 30 access the high availability score for the one or more network connection services via a browser-based dashboard. In other examples, users may use a customer portal, customer applications, and/or a console such as a command-line interface or graphical user interface. In some examples, the users or clients include customers associated with customer networks 12, e.g., enterprise customers, cloud service and content providers, carriers, and network connection service providers (NSPs). Users of application(s) 130 may also include operators/administrators of the co-location facility 200 provider.

Thus, co-location facility 200 may perform a granular assessment to determine which services and products in the network infrastructure 20 do not have high availability. Further, co-location facility 200 may determine whether specific pieces of hardware, software, and network topology need to be upgraded or redesigned. Additionally, using the high availability evaluation tracker 30, co-location facility 200 may determine whether specific components need configuration changes. Further, co-location facility 200 may dynamically track high availability across each network device in the network infrastructure 20 to account for changes in the topology of network infrastructure 20 as additional network devices are added and removed from the network, as well as to account for changes to each network devices due to the insertion or removal of hardware components and/or modifications to the device's control software.

FIG. 4 is an illustration of an example dashboard 400 for presenting information on the high availability evaluation of network connection services of one or more co-location facilities, in accordance with techniques of the disclosure. In the example of FIG. 4, a high availability evaluation tracker, such as high availability evaluation tracker 30 of FIG. 1, determines a high availability score for one or more network connection services and outputs the high availability score for the one or more network connection services in a dashboard representation 400 for display to a user. High availability evaluation tracker 30 arranges a plurality of indications of a high availability score for one or more network connection services 402A-402C (collectively, "network connection services 402") in a grid representation comprising a plurality of rows and columns. In the example of FIG. 4, each column of the plurality of columns depicts one co-location facility 402 of a plurality of co-location facilities 402, and each row depicts one network connection service 402 of the one or more network connection services 402. A checkmark denotes the presence of high availability for a specific network connection service 402 at a specific co-location facility 402.

For example, as depicted in FIG. 4, a cloud exchange service 402A has high availability at co-location facilities in Silicon Valley and Los Angeles, but does not have high availability at co-location facilities in Ashburn or Toronto.

Similarly, an Internet exchange service 402B has high availability at co-location facilities in Toronto and Singapore, but does not have high availability at co-location facilities in Silicon Valley and Los Angeles. Accordingly, a user may use information presented by dashboard 400 to quickly identify whether specific pieces of hardware, software, and network topology need to be upgraded or redesigned across a plurality of co-location facilities 10. Additionally, a user may use information presented by dashboard 400 to quickly identify whether specific components across specific co-location facilities 10 need configuration changes.

Figure 5:
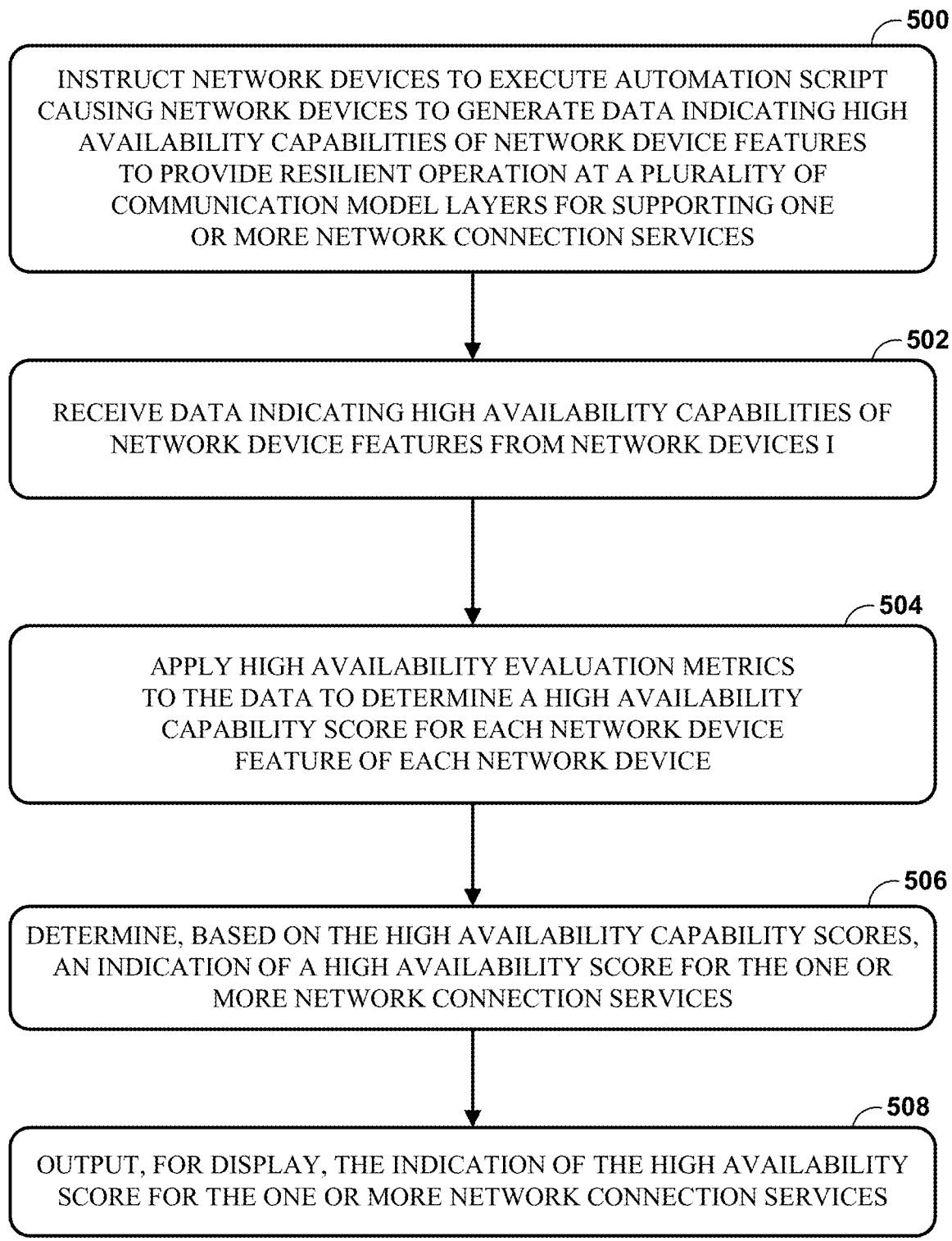
FIG. 5 is a flowchart illustrating an example operation for evaluating the high availability of network connection services of one or more co-location facilities, in accordance with techniques of the disclosure.

FIG. 5 is a flowchart illustrating an example operation for evaluating the high availability of network connection services of one or more co-location facilities, in accordance with techniques of the disclosure. For convenience, FIG. 5 is described with respect to FIGS. 1 and 3. However, the operation of FIG. 5 may be suitable to other examples of the techniques of the disclosure, such as the example of FIG. 2.

With respect to FIG. 5, high availability tracker 30 performs an evaluation of the high availability of the network infrastructure 20 of co-location facility 10 across multiple ISO OSI-model or TCP/IP-model layers. The high availability tracker 30 applies a high availability metric to each device feature of network devices 24, 26 in the network infrastructure 20. Based on the high availability of the device features of network devices 24, 26, high availability tracker 30 determines a high availability rating for each device 24, 26 at multiple ISO OSI-model or TCP/IP-model layers. High availability tracker 30 uses the overall high availability ratings of each device 24, 26 to determine an overall high availability score for each network connection service provided by devices 24, 26 of co-location facility 10 across multiple ISO OSI-model or TCP/IP-model layers. High availability tracker 30 presents, for display on a dashboard 132, the high availability rating for each network connection service in the one or more co-location facilities.

In one example, high availability evaluation tracker 30 issue commands each network device 24, 26 of a plurality of network devices 24, 26 in one or more co-location facilities 10 (500). In one example, high availability tracker 30 issues these commands using one or more monitoring protocols 32 (e.g., SNMP, Netflow, Netconf, or other network device monitoring protocol). The automation script, when executed, causes each device 24, 26 to compile and organize data indicating respective high availability capabilities of a plurality of network device features of the network device 24, 26 to provide resilient operation at a plurality of communication model layers for supporting one or more network connection services to one or more customer networks 202 co-located within the one or more co-location facilities 10. For example, the data may include information from each device regarding its current configuration of features, including data describing state information, driver versions, network protocols, provisioning information, routing and forwarding information, device-level resiliency, and path-level resiliency. The data may further include information for the current configuration of features of each network device, including data describing state information, driver versions, network protocols, provisioning information, routing and forwarding information. Further, the data may indicate whether the network device possesses a power supply redundancy, whether the network device possesses a cooling fan redundancy, whether the network device comprises a chassis comprising a dual-route processor, whether the network device is configured to use one of a Hot Standby Router Protocol (HSRP), a Virtual Router Redundancy Protocol (VRRP), or a Gateway Load Balancing Protocol (GLBP), whether a routing protocol of the network device implements a static address, a Border Gateway Protocol (BGP), or an Open Shortest Path First (OSPF) protocol, whether the network device is configured to implement Bidirectional Forwarding Detection (BFD) or whether the network device is configured to implement one of Internet Protocol (IP) Fast Reroute Framework (FFR) or Multiprotocol Label Switching (MPLS) FFR. For example, the automation script may cause router 24A to indicate, via monitoring protocol 32, to high availability tracker 30 that router 24A has one power supply, three cooling fans, and implements BGP protocol by transmitting such configuration to high availability tracker 30.

Upon collecting this data, the automation script causes each device 24, 26 to transmit the collected information to high availability evaluation tracker 30 for analysis. High availability evaluation tracker 30 receives the data from each network device 24, 26 via the one or more monitoring protocols 32 (502). High availability tracker 30 applies high availability evaluation metrics to the data from each network device 24, 26 to determine, for each network device feature of the plurality of network device features of the network device 24, 26, a high availability capability score for the network device feature (504). In one example, high availability tracker 30 applies a high availability metric to this collected data to determine a high availability score for each network device 24, 26 of network infrastructure 20. In the above example, high availability tracker 30 applies a high availability metric for power supplies to router 24A. By applying the high availability metric, high availability tracker 30 determines that router 24A is not highly available because router 24A possesses only a single power supply, and therefore does not have power supply redundancy. Accordingly, high availability tracker 30 applies a unique metric to each feature described by the data received from devices 24, 26 to determine an overall high availability capability score for the network device feature.

High availability tracker 30 determines, based on the high availability capability scores for each network device feature of the plurality of network device features of each of the plurality of network devices 24, 26, an indication of a high availability score for the one or more network connection services (506). In one example, high availability tracker 30 adds the high availability capability score for each of the network device features of each of the network devices 24, 26, wherein the sum of the high availability capability scores is the high availability score for the network device. High availability tracker 30 further adds the high availability scores for each of the network devices to determine an overall high availability score for the one or more network connection services provided by the network devices.

In another example, high availability tracker 30 determines whether each high availability capability score for each of the network device features of each of the network devices 24, 26, exceeds a threshold score. Upon determining that one or more high availability capability scores fail to meet or exceed the threshold score, the high availability tracker 30 assigns a failing value for the high availability score for the corresponding network device. Similarly, high availability tracker 30 determines whether each high availability score for each of the network devices exceeds a threshold score. Upon determining that one or more high availability scores of the network devices fail to meet or exceed the threshold score, the high availability tracker 30 assigns a failing value for an overall high availability score for the one or more network connection services. Thus, in one example, high availability tracker 30 calculates a granular, numerical value for high availability score for the one or more network connection services, while in another example, high availability tracker 30 calculates a binary passing/failing value for the high availability score for the one or more network connection services.

High availability tracker 30 outputs, for display, the indication of the high availability score for the one or more network connection services (508). In one example, high availability tracker 30 arranges the high availability score for the one or more network connection services such that a unique high availability score is presented for each network connection service and for each co-location facility 10. For example, high availability tracker 30 may arrange the high availability score for the one or more network connection services in a grid representation such that each row of the grid indicates a different type of network connection service, and each column of the grid indicates a different co-location facility 10.

Thus, co-location facility 10 may perform a granular assessment to determine which services and products in the network infrastructure 20 do not have high availability. Further, co-location facility 10 may determine whether specific pieces of hardware, software, and network topology need to be upgraded or redesigned. Additionally, using the high availability evaluation tracker 30, co-location facility 10 may determine whether specific components need configuration changes. Further, co-location facility 10 may dynamically track high availability across each device 24, 26 in the network infrastructure 20 to account for changes in the topology of network infrastructure 20 as additional devices 24, 26 are added and removed from the network, as well as to account for changes to each device 24, 26 due to the insertion or removal of hardware components and/or modifications to the device's control software.

Figure 6:
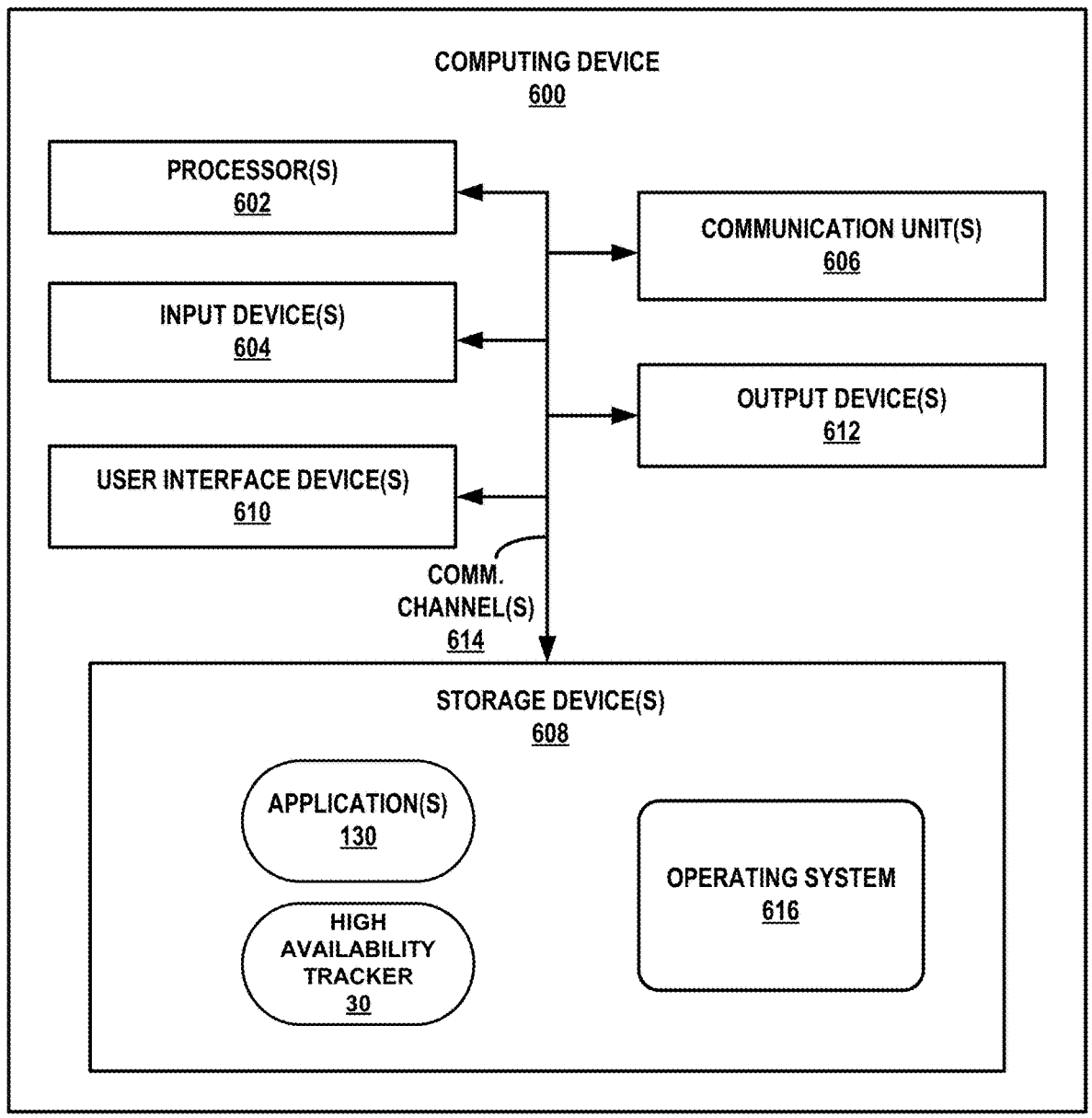
FIG. 6 is a block diagram illustrating an example computing device for executing the high availability tracker of FIG. 1, in accordance with techniques of the disclosure.

FIG. 6 is a block diagram illustrating an example computing device for executing the high availability tracker of FIG. 1, in accordance with techniques of the disclosure. FIG. 6 may illustrate a particular example of a server or other computing device 600 that includes one or more processor(s) 602 for executing any one or more of applications 130 and high availability tracker 30 of FIG. 1 as described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). Computing device 600 may be located and execute, for example, within any device 24, 26 of network infrastructure 20 or co-location facility 10, another interconnection facility, or at a branch office or cloud computing environment employed or used by a cloud exchange provider. Multiple computing devices 600 may execute corresponding instances of applications 130 and high availability tracker 30 in a distributed manner. In some cases, each of the multiple computing devices 600 may execute different combinations of applications 130 and high availability tracker 30. In other words, a computing device 600 may not execute each of applications 130 and high availability tracker 30.

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 130, high availability tracker 30, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. Other examples of such network interfaces may include 3G and WiFi radios. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622 and interconnection platform application(s) 624 with processors 602, communication unit 606, storage device 608, input device 604, user interface devices 610, and output device 612.

Application 130 and high availability tracker 30 may also include program instructions and/or data that are executable by computing device 600. Example applications 130 executable by computing device 600 may include browser 131 and dashboard 132 of FIG. 1.

FIG. 7 is an illustration of an example dashboard 700 for presenting information on the high availability evaluation of one or more network features of a network device 24, 26, in accordance with techniques of the disclosure. Such a network device may include devices 24, 26 of co-location facility 10. In the example of FIG. 7, a high availability evaluation tracker, such as high availability evaluation tracker 30 of FIG. 1, receives data from each of a plurality of network devices 24, 26 in one or more co-location facilities 10, the data indicating a high availability capability of each network device feature of a plurality of network device features of the network device 24, 26 to provide resilient operation at a plurality of ISO OSI-model or TCP/IP-model layers for supporting one or more network connection services to one or more customer networks 12A co-located within the one or more co-location facilities 10. Upon receiving the data, high availability evaluation tracker 30 applies high availability evaluation metrics to the data from each network device 24, 26 to determine a high availability capability score for the one or more network features of the network device 24, 26. In some examples, high availability evaluation tracker 30 outputs the high availability capability score for the one or more network features in a dashboard representation 700 for display to a user. As referred to herein, "intra-chassis high availability score tracking" refers to determining a high availability score for each device feature of a plurality of network device features of a network device 24, 26 to obtain an overall high availability score for the network device 24, 26.

With respect to the example of FIG. 7, dashboard 700 describes a high availability score for a particular device 24, 26 of network infrastructure 20. High availability tracker 30 may determine high availability scores for each corresponding device 24, 26 of network infrastructure 20 using techniques described below, and present, via applications 130 and to a user, such information in the form of dashboard 700.

Column 702 of dashboard 700 depicts each ISO OSI-model layer from layer 0 to layer 7. Column 704 depicts a plurality of network device features for each OSI-model layer that are configured in the network device. In the example of FIG. 7, each of the plurality of network device features are classified according to the OSI-model layer that the network device feature belongs to. Column 706 depicts a plurality of high availability-related sub-features of the network device features of column 704. Column 706 provides further granularity into the configuration of each of the device features of the network device. For example: If a device 24, 26 is running a routing protocol, such as OSPF, high availability tracker 30 may further determine whether the device 24, 26 supports (or has activated) features such as Graceful Restart (GR), Non-stop Forwarding (NSF) and/or Non-stop Routing (NSR), Bi-directional forwarding detection (BFD), or OSPF Link State Advertisement (LSA) throttling. While in the example of FIG. 7, dashboard 700 depicts the data from a device 24, 26 according to the ISO OSI-model layer, in other examples, dashboard 700 depicts the data from a device 24, 26 according to the TCP/IP-model layer.

To determine the high availability capability score for each network device feature, high availability tracker 30 determines whether device 24, 26 supports, has configured, or has activated each feature listed in column 704 and each sub-feature listed in column 706. Column 708 depicts the high availability capability score that high availability tracker 30 assigns if the feature or sub-feature is present, while column 710 depicts the high availability capability score that high availability tracker 30 assigns if the feature or sub-feature is absent. In one example, for each such device feature or sub-feature that device 24, 26 supports, has configured, or has activated, high availability tracker 30 assigns a high-availability capability score of 5. Similarly, for each such device feature or sub-feature that device 24, 26 does not support, has not configured, or has not activated, high availability tracker 30 assigns a high-availability capability score of 1.

In some examples, not all high availability sub-features are important to deployment reliability and robustness. In this example, such features may be preferable but not necessary. In such a case, high availability tracker 30 may further assign a numerical weight to each feature to determine a weighted high availability capability score for each network device feature. In the example of FIG. 7, Non-Stop Forwarding (NSF) has a weight factor of "1", while BGP physical interface card (PIC) "BGP PIC" has a weight of "0.9." To determine a weighted high-availability capability score, high availability tracker 30 multiplies the high availability capability score (e.g., an unweighted high availability capability score) of the device feature or sub-feature by the weight for the feature listed in column 714. For example, high availability tracker 30 assigns a weighted high-availability capability score of "5" (e.g., 5*1) to the device 24, 26 for supporting NSF and a weighted high-availability capability score of "4.5" (e.g., 5*0.9) to the device 24, 26 for supporting BGP PIC. Due to the changing number, types, and importance of different features and sub-features, the list of features and sub-features in dashboard 700 may be very long and may have new features or sub-features added or removed as new protocols are added or retired. Thus, incorporating such a weight factor allows users of network infrastructure 10 to fine-tune and customize the weight of features and sub-features in dashboard 700 and the relative importance of each of the features and sub-features to the overall high-availability score for the network device 24, 26, based on the deployment requirements of a particular system.

After determining a weighted high availability capability score for each of the features and sub-features of device 24, 26, high availability tracker 30 determines a high availability score across each ISO OSI-model or TCP/IP layer of the device 24, 26. In one example, high availability tracker 30 determines a high availability score across each layer of the device by adding together the weighted high availability capability score for each of the features and sub-features within a particular layer. As depicted in the example of FIG. 7, high availability tracker 30 calculates a high availability score 718A of 33 for layer 3 of the example device, a high availability score 718B of 19.9 layer 2 of the example device, and a high availability score 718C of 5 layer 1 of the example device. To obtain an overall high availability score for the device, high availability tracker 30 adds the weighted high capability availability scores for each of the features and sub-features of device 24, 26. As depicted in the example of FIG. 7, high availability tracker 30 calculates a high availability score of 57.9 for the example device.

Upon determining the weighted high availability capability scores for the plurality of network device features, the high availability scores for each ISO OSI-model or TCP/IP layer of the device 24, 26, and/or the high availability score for the network device 24, 26, high availability evaluation tracker 30 outputs the scores in a dashboard representation 700 for display to a user. Thus, a user may examine dashboard 700 to rapidly determine, for each network device 24, 26 of network infrastructure 20, and across each layer of the network stack implemented by the network device, where deficiencies in the high availability of the device may exist. Further, such a system may assist the user in determining what components or upgrades may be made to the network devices 24, 26 of network infrastructure 20 to make each network device 24, 26 highly available.

FIG. 8 is an illustration of an example dashboard 800 for presenting information on the high availability evaluation of one or more network interconnection services of one or more co-location facilities 10, in accordance with techniques of the disclosure. In the example of FIG. 8, a high availability evaluation tracker, such as high availability evaluation tracker 30 of FIG. 1, determines a high availability score for one or more interconnection services provided by a plurality of network devices 24, 26 of co-location facility 10 and outputs the high availability score for the one or more network interconnection services in a dashboard representation 800 for display to a user. Such network devices may include devices 24, 26 of co-location facility 10.

As described above, with respect to FIG. 7, high availability evaluation tracker 30 receives data from each of a plurality of network devices 24, 26 in one or more co-location facilities 10. Using this data, high availability evaluation tracker 30 applies high availability evaluation metrics to the data from each of the plurality of network device 24, 26 to determine a high availability capability score for the one or more network features of the network device 24, 26 and a high availability score for each of the plurality of network devices 24, 26.

In the example of FIG. 8, based on the high availability capability scores for the one or more network features of each network device 24, 26 and the high availability scores for each of the plurality of network devices 24, 26, high availability evaluation tracker 30 determines a high availability score for each of the one or more network interconnection services. For example, and with reference to FIG. 8, co-location facility 10 includes three types of interconnection services, Interconnection A, Interconnection B, and Interconnection C. Column 804 of dashboard 800 depicts that Interconnection A includes devices 1-4, Interconnection B includes devices 5-6, and Interconnection C includes devices 7-8. Furthermore, column 806 depicts high availability scores calculated by high availability tracker 30 for each of the network devices 1-8. Column 806 depicts a total high availability score for each of Interconnection A, B, and C. In some examples, high availability tracker 30 determines the high availability score for each interconnection by adding the high availability scores for each of the network devices of the corresponding Interconnection. In the example of FIG. 8, Interconnection A has a high availability score of 530, while Interconnection B has a high availability score of 300. Further, high availability tracker 30 has not yet calculated a high availability score for Interconnection C.

Column 810 depicts a normalized high availability score for each of Interconnection A, B, and C. In some examples, high availability tracker 30 determines the normalized high availability score for the Interconnection by dividing the high availability score for the corresponding Interconnection by the number of devices within the Interconnection. In the example of FIG. 8, Interconnection A has a normalized high availability score of 132.5 (530/4), while Interconnection B has a normalized high availability score of 150 (300/2). Further, high availability tracker 30 has not yet calculated a normalized high availability score for Interconnection C.

Upon determining the high availability scores and normalized high availability scores for the one or more interconnection services, high availability evaluation tracker 30 outputs the scores in a dashboard representation 800 for display to a user. For example, if a user observes only the total high availability score, Interconnection A may appear to be superior to Interconnection B in terms of high availability. However, by looking at the normalized high availability score, Interconnection B appears superior. In other words, an Interconnection with a large high availability score may have a large number of devices with low-to-average high availability scores, while an Interconnection with a high normalized high availability score may have fewer devices, but each device is highly available. Thus, a user may use the high availability score and the normalized high availability score of each Interconnection to visualize the high availability of the network infrastructure at an network interconnection level and to make informed decisions regarding corrective actions to be taken on to ensure high availability across the interconnections of the co-location facility. Thus, a user may examine dashboard 800 to rapidly determine, for each interconnection service of co-location facility 10, where deficiencies in the high availability of the interconnection service may exist. Further, such a system may assist the user in determining what components or upgrades may be made to the underlying network devices 24, 26 of each interconnection service to make each interconnection service highly available.

As a result of the techniques of this disclosure, the co-location facility 10 provider may evaluate the high availability of each network connection service or product across one or more ISO OSI-model or TCP/IP-model layers to improve the assessment accuracy of network device reliability and redundancy across network infrastructure 20. Further, in some examples, the techniques may provide resource-specific indications of areas that require additional network device resources to address deficiencies in reliability or redundancy. For example, as described above, high availability tracker 30 may apply a high availability metric to data from a plurality of network devices 24, 26 to determine a high availability capability score for one or more device feature of each network device of the plurality of network devices 24, 26. Based on the high availability capability scores of the one or more network device features, high availability tracker 30 determines a high availability score for each of the plurality of network devices 24, 26. High availability tracker 30 may present, for display to a user, the high availability capability score for each device 24, 26 via a browser-based interface or dashboard, for example, as the high availability dashboard 700 of FIG. 7.

Further, using the high availability capability scores for the one or more device features of the plurality of network devices 24, 26 and the high availability scores for the plurality of network devices, high availability tracker 30 may determine a high availability score for one or more interconnection services provided by the plurality of network devices 24, 26. High availability tracker 30 may present, for display to a user, the high availability capability score for each of the one or more interconnection services via a browser-based interface or dashboard, for example, as the high availability dashboard 800 of FIG. 8.

Further, using the high availability scores for the plurality of interconnection services, high availability tracker 30 may determine a high availability score for each of a plurality of co-location facilities 10 that offer the plurality of interconnection services to customer networks 12 of the co-location facilities 10. Applications 130 may present, for display to a user, the high availability capability score for each co-location facility via a browser-based interface or dashboard, for example, as the high availability dashboard of FIG. 4.

Accordingly, the co-location facility 10 provider may evaluate the high availability of each network connection service or product across one or more ISO OSI-model or TCP/IP-model layers with granularity across each co-location facility of a plurality of co-location facilities, across each interconnection service of a plurality of interconnection services offered by the plurality of co-location facilities, and across each network device of a plurality of network devices providing the plurality of interconnection services. Such techniques as described herein may provide resource-specific indications of areas that require additional network device resources to address deficiencies in reliability or redundancy.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   receiving, by a computing system, data from each network device of a plurality of network devices in one or more co-location facilities, the data from each network device indicating respective high availability capabilities of a plurality of network device features of the network device, wherein the high availability capabilities indicate an ability of the plurality of network device features to enable the network device to provide redundant and resilient operation at a plurality of communication model layers for supporting one or more network connection services to one or more customer networks co-located within the one or more co-location facilities despite failure of one or more of the plurality of network device features;
   applying, by the computing system, high availability evaluation metrics to the data from each network device to determine, for each network device feature of the plurality of network device features of the network device, a high availability capability score for the network device feature;
   determining, by the computing system based on the high availability capability scores for each network device feature of the plurality of network device features of each of the plurality of network devices, an indication of a high availability score for each of the one or more network connection services; and
   outputting, by the computing system for display, the indication of the high availability score for the one or more network connection services.

2. The method of claim 1, wherein the plurality of communication model layers is one of a plurality of International Standards Organization (ISO) Open Systems Interconnection (OSI) model layers and a plurality of Transmission Control Protocol/Internet Protocol (TCP/IP) model layers.

3. The method of claim 1,
   wherein the one or more co-location facilities comprises a plurality of co-location facilities,
   wherein determining, based on the high availability capability scores for each network device feature of the plurality of network device features of each of the plurality of network devices, the indication of the high availability score for the one or more network connection services comprises determining, based on the high availability capability scores for each network device feature of the plurality of network device features of each of the plurality of network devices and separately for each co-location facility of the plurality of co-location facilities, a plurality of indications of the high availability score for the one or more network connection services, wherein each indication of the plurality of indications corresponds to each co-location facility of the plurality of co-location facilities, wherein outputting, for display, the indication of the high availability score for the one or more network connection services comprises outputting, for display and separately for each co-location facility of the plurality of co-location facilities, the plurality of indications of the high availability score for the one or more network connection services.

4. The method of claim 3, wherein outputting, for display and separately for each co-location facility of the plurality of co-location facilities, the plurality of indications of the high availability score for the one or more network connection services comprises:

outputting, for display, an interface that includes a grid representation comprising a plurality of rows and columns, wherein each column of the plurality of columns depicts indications of the high availability score for the one or more network connection services of one co-location facility of the plurality of co-location facilities, and each row depicts indications of the high availability score for one network connection service of the one or more network connection services for one or more of the plurality of co-location facilities.

5. The method of claim 1, wherein the plurality of network device features provides protocol resiliency at OSI model layer 2 and layer 3, wherein applying the high availability evaluation metrics to the data from each network device to determine, for each network device feature of the plurality of network device features of the network device, the high availability capability score for the network device feature comprises applying the high availability evaluation metrics to the data from each network device to determine, for each network device feature of the plurality of network device features of the network device, a score for network protocol resiliency at OSI model layer 2 and layer 3 for the network device feature, and wherein determining, based on the high availability capability scores for each network device feature of the plurality of network device features of each of the plurality of network devices, the indication of the high availability score for the one or more network connection services comprises determining, based on the score for network protocol resiliency at OSI model layer 2 and layer 3 for each network device feature of the plurality of network device features of each of the plurality of network devices, an indication of a high availability score for the one or more network connection services.

6. The method of claim 1, wherein the plurality of network devices are arranged in a first network topology, and the plurality of network device features provide network topology resiliency at OSI model layer 2 and layer 3, wherein applying the high availability evaluation metrics to the data from each network device to determine, for each network device feature of the plurality of network device features of the network device, the high availability capability score for the network device feature comprises applying the high availability evaluation metrics to the data from each network device to determine, for each network device feature of the plurality of network device features of the network device, a score for network topology resiliency at OSI model layer 2 and layer 3 for the network device feature, and wherein determining, based on the high availability capability scores for each network device feature of the plurality of network device features of each of the plurality of network devices, the indication of the high availability score for the one or more network connection services comprises determining, based on the score for network topology resiliency at OSI model layer 2 and layer 3 for each network device feature of the plurality of network device features of each of the plurality of network devices, an indication of a high availability score for the one or more network connection services.

7. The method of claim 1, wherein high availability evaluation metrics comprise a unique high availability evaluation metric for each network device feature of the plurality of network device features, and wherein determining, based on the high availability capability scores for each network device feature of the plurality of network device features of each of the plurality of network devices, the indication of the high availability score for the one or more network connection services comprises determining, by summing the high availability capability scores for each network device feature of the plurality of network device features of each of the plurality of network devices, the indication of the high availability score for the one or more network connection services.

8. The method of claim 1, wherein determining, based on the high availability capability scores for each network device feature of the plurality of network device features of each of the plurality of network devices, the indication of the high availability score for the one or more network connection services comprises:

applying a threshold to each of the high availability capability scores for each network device feature of the plurality of network device features of each of the plurality of network devices of the one or more co-location facilities supporting the one or more network connection services;

upon determining that each of the high availability capability scores for each network device feature of the plurality of network device features exceeds the threshold, outputting a positive indication of the high availability score for the corresponding the one or more network connection services; and upon determining that each of the high availability capability scores for each network device feature of the plurality of network device features does not exceed the threshold, outputting a negative indication of the high availability score for the corresponding the one or more network connection services, wherein outputting, for display, the indication of the high availability score for the one or more network connection services comprises outputting, for display on a dashboard, the indication of the high availability score for the one or more network connection services.

9. The method of claim 1, further comprising:

transmitting, by the computing system, instructions to each network device of the plurality of network devices in the one or more co-location facilities, wherein the instructions are configured to cause the network device to execute an automation script, wherein the automation script is configured to cause the network device to:
compile the data indicating respective high availability capabilities of a plurality of network device features of the network device; and
transmit the data indicating respective high availability capabilities of a plurality of network device features of the network device to the computing system.

10. The method of claim 9, further comprising detecting, by the computing system, a change in a network topology of the one or more co-location facilities; and
wherein transmitting the instructions to each network device of the plurality of network devices in the one or more co-location facilities comprises transmitting, in response to detecting the change in the network topology of the one or more co-location facilities, instructions to each network device of the plurality of network devices in the one or more co-location facilities.

11. The method of claim 1, wherein applying the high availability evaluation metrics to the data from each network device to determine, for each network device feature of the plurality of network device features of the network device, the high availability capability score for the network device feature comprises:
applying high availability evaluation metrics to the data from each network device to determine, for each network device feature of the plurality of network device features of the network device, an unweighted high availability capability score for the network device feature; and
applying a numerical weight to the unweighted high availability capability score for the network device feature to determine, for each network device feature of the plurality of network device features of the network device, the high availability capability score for the network device feature.

12. A computing system configured to:
receive data from each network device of a plurality of network devices in one or more co-location facilities, the data from each network device indicating respective high availability capabilities of a plurality of network device features of the network device, wherein the high availability capabilities indicate an ability of the plurality of network device features to enable the network device to provide redundant and resilient operation at a plurality of communication model layers for supporting one or more network connection services to one or more customer networks co-located within the one or more co-location facilities despite failure of one or more of the plurality of network device features;
apply high availability evaluation metrics to the data from each network device to determine, for each network device feature of the plurality of network device features of the network device, a high availability capability score for the network device feature;
determine, based on the high availability capability scores for each network device feature of the plurality of network device features of each of the plurality of network devices, an indication of a high availability score for each of the one or more network connection services; and
output, for display, the indication of the high availability score for the one or more network connection services.

13. The computing system of claim 12, wherein the plurality of communication model layers is one of a plurality of International Standards Organization (ISO) Open Systems Interconnection (OSI) model layers and a plurality of Transmission Control Protocol/Internet Protocol (TCP/IP) model layers.

14. The computing system of claim 12,
wherein the one or more co-location facilities comprises a plurality of co-location facilities,
wherein the computing system configured to determine, based on the high availability capability scores for each network device feature of the plurality of network device features of each of the plurality of network devices, the indication of the high availability score for the one or more network connection services is further configured to determine, based on the high availability capability scores for each network device feature of the plurality of network device features of each of the plurality of network devices and separately for each co-location facility of the plurality of co-location facilities, a plurality of indications of the high availability score for the one or more network connection services, wherein each indication of the plurality of indications corresponds to each co-location facility of the plurality of co-location facilities, and
wherein the computing system configured to output, for display, the indication of the high availability score for the one or more network connection services is further configured to output, for display and separately for each co-location facility of the plurality of co-location facilities, the plurality of indications of the high availability score for the one or more network connection services.

15. The computing system of claim 14, wherein the computing system configured to output, for display and separately for each co-location facility of the plurality of co-location facilities, the plurality of indications of the high availability score for the one or more network connection services is further configured to:
arrange the plurality of indications of the high availability score for the one or more network connection services in a grid representation comprising a plurality of rows and columns, wherein each column of the plurality of columns depicts one co-location facility of the plurality of co-location facilities, and each row depicts one network connection service of the one or more network connection services; and
output, for display, the grid representation of the plurality of indications of the high availability score for the one or more network connection services.

16. The computing system of claim 12, wherein the plurality of network device features provides protocol resiliency at OSI model layer 2 and layer 3,
wherein the computing system configured to apply the high availability evaluation metrics to the data from each network device to determine, for each network device feature of the plurality of network device features of the network device, the high availability capability score for the network device feature is further configured to apply the high availability evaluation metrics to the data from each network device to determine, for each network device feature of the plurality of network device features of the network device, a score for network protocol resiliency at OSI model layer 2 and layer 3 for the network device feature, and
wherein the computing system configured to determine, based on the high availability capability scores for each network device feature of the plurality of network device features of each of the plurality of network devices, the indication of the high availability score for the one or more network connection services is further configured to determine, based on the score for network protocol resiliency at OSI model layer 2 and layer 3 for each network device feature of the plurality of network device features of each of the plurality of network devices, an indication of a high availability score for the one or more network connection services.

17. The computing system of claim 12, wherein the plurality of network devices are arranged in a first network topology, and the plurality of network device features provide network topology resiliency at OSI model layer 2 and layer 3,
wherein the computing system configured to apply the high availability evaluation metrics to the data from each network device to determine, for each network device feature of the plurality of network device features of the network device, the high availability capability score for the network device feature is further configured to apply the high availability evaluation metrics to the data from each network device to determine, for each network device feature of the plurality of network device features of the network device, a score for network topology resiliency at OSI model layer 2 and layer 3 for the network device feature, and
wherein the computing system configured to determine, based on the high availability capability scores for each network device feature of the plurality of network device features of each of the plurality of network devices, the indication of the high availability score for the one or more network connection services is further configured to determine, based on the score for network topology resiliency at OSI model layer 2 and layer 3 for each network device feature of the plurality of network device features of each of the plurality of network devices, an indication of a high availability score for the one or more network connection services.

18. The computing system of claim 12, wherein high availability evaluation metrics comprise a unique high availability evaluation metric for each network device feature of the plurality of network device features, and
wherein the computing system configured to determine, based on the high availability capability scores for each network device feature of the plurality of network device features of each of the plurality of network devices, the indication of the high availability score for the one or more network connection services is further configured to determine, by summing the high availability capability scores for each network device feature of the plurality of network device features of each of the plurality of network devices, the indication of the high availability score for the one or more network connection services.

19. The computing system of claim 12, wherein the computing system configured to determine, based on the high availability capability scores for each network device feature of the plurality of network device features of each of the plurality of network devices, the indication of the high availability score for the one or more network connection services is further configured to:
apply a threshold to each of the high availability capability scores for each network device feature of the plurality of network device features of each of the plurality of network devices of the one or more co-location facilities supporting the one or more network connection services;
upon determining that each of the high availability capability scores for each network device feature of the plurality of network device features exceeds the threshold, output a positive indication of the high availability score for the corresponding the one or more network connection services; and
upon determining that each of the high availability capability scores for each network device feature of the plurality of network device features does not exceed the threshold, output a negative indication of the high availability score for the corresponding the one or more network connection services; and
wherein the computing system configured to output, for display, the indication of the high availability score for the one or more network connection services is further configured to output, for display on a dashboard, the indication of the high availability score for the one or more network connection services.

20. The computing system of claim 12, wherein the computing system is further configured to:
transmit instructions to each network device of the plurality of network devices in the one or more co-location facilities, wherein the instructions are configured to cause the network device to execute an automation script, wherein the automation script is configured to cause the network device to:
compile the data indicating respective high availability capabilities of a plurality of network device features of the network device; and
transmit the data indicating respective high availability capabilities of a plurality of network device features of the network device to the computing system.

21. The computing system of claim 12, wherein the computing system is further configured to apply the high availability evaluation metrics to the data from each network device to determine, for each network device feature of the plurality of network device features of the network device, the high availability capability score for the network device feature is further configured to:
apply high availability evaluation metrics to the data from each network device to determine, for each network device feature of the plurality of network device features of the network device, an unweighted high availability capability score for the network device feature; and
apply a numerical weight to the unweighted high availability capability score for the network device feature to determine, for each network device feature of the plurality of network device features of the network device, the high availability capability score for the network device feature.

22. A non-transitory computer-readable medium comprising instructions that, when executed, cause one or more processors of a computing system to:
receive data from each network device of a plurality of network devices in one or more co-location facilities, the data from each network device indicating respective high availability capabilities of a plurality of network device features of the network device, wherein the high availability capabilities indicate an ability of the plurality of network device features to enable the network device to provide redundant and resilient operation at a plurality of communication model layers for supporting one or more network connection services to one or more customer networks co-located within the one or more co-location facilities despite failure of one or more of the plurality of network device features;
apply high availability evaluation metrics to the data from each network device to determine, for each network device feature of the plurality of network device features of the network device, a high availability capability score for the network device feature;

determine, based on the high availability capability scores for each network device feature of the plurality of network device features of each of the plurality of network devices, an indication of a high availability score for the one or more network connection services; and output, for display, the indication of the high availability score for the one or more network connection services.

\* \* \* \* \*